United States Patent
Guo et al.

(10) Patent No.: US 8,049,930 B2
(45) Date of Patent: Nov. 1, 2011

(54) METHOD OF HALFTONE WATERMARKING FOR HIDING MULTI-TONE WATERMARK OR TWO-TONE WATERMARK

(75) Inventors: Jing-Ming Guo, Taipei (TW); Yun-Fu Liu, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 521 days.

(21) Appl. No.: 12/283,902

(22) Filed: Sep. 15, 2008

(65) Prior Publication Data
US 2010/0067057 A1    Mar. 18, 2010

(51) Int. Cl.
*G06K 15/00*    (2006.01)
(52) U.S. Cl. ............... 358/3.06; 358/3.03; 358/3.05; 358/3.28; 358/534; 358/536; 382/100
(58) Field of Classification Search .............. None
See application file for complete search history.

(56) References Cited

U.S. PATENT DOCUMENTS

| | | | |
|---|---|---|---|
| 4,668,597 A * | 5/1987 | Merchant ................ | 430/22 |
| 5,107,346 A * | 4/1992 | Bowers et al. ........... | 358/447 |
| 6,671,068 B1 * | 12/2003 | Chang et al. ............ | 358/1.9 |
| 6,690,811 B2 * | 2/2004 | Au et al. ................. | 382/100 |
| 6,763,121 B1 * | 7/2004 | Shaked et al. ........... | 382/100 |
| 7,006,256 B2 * | 2/2006 | Wang et al. ............. | 358/3.28 |
| 7,058,199 B1 * | 6/2006 | Au et al. ................. | 382/100 |
| 7,660,429 B2 * | 2/2010 | Shaked et al. ........... | 382/100 |
| 7,804,977 B2 * | 9/2010 | Au et al. ................. | 382/100 |
| 7,970,164 B2 * | 6/2011 | Nakamura et al. ...... | 382/100 |
| 2002/0106102 A1 * | 8/2002 | Au et al. ................. | 382/100 |
| 2003/0218778 A1 * | 11/2003 | Ohta ........................ | 358/3.04 |
| 2005/0031160 A1 * | 2/2005 | Shaked et al. ........... | 382/100 |
| 2007/0104349 A1 * | 5/2007 | Myodo et al. ........... | 382/100 |
| 2008/0019559 A1 * | 1/2008 | Wang et al. ............. | 382/100 |
| 2009/0003646 A1 * | 1/2009 | Au et al. ................. | 382/100 |

* cited by examiner

*Primary Examiner* — King Poon
*Assistant Examiner* — Dung Tran
(74) *Attorney, Agent, or Firm* — J.C. Patents

(57) ABSTRACT

A method is performed to hide a watermark in two halftone images or in a single halftone image. The halftone image contains information of the hidden watermark, and each pixel value of the halftone image is associated with a corresponding offset value. The offset value is determined according to a corresponding pixel value of the watermark and a corresponding pixel value of another halftone image. The offset value is used to compensate a corresponding input value and a corresponding original error value of the halftone image.

18 Claims, 22 Drawing Sheets

| $W_{i,j}$ | $EDF1_{i,j}$ | $v_{i,j}$ | $e_{i,j}$ | Likelihood of $EDF2^A_{i,j} \in (EDF2)_B$ |
|---|---|---|---|---|
| 1 | 0 | $+N_A \times \left(1 - \frac{1}{255}\right)$ | $-N_A \times \left(1 - \frac{1}{255}\right)$ | $\sim\left(1 - \frac{1}{255}\right)$ or $\sim\frac{254}{255}$ |
| 80 | 0 | $+N_A \times \left(1 - \frac{80}{255}\right)$ | $-N_A \times \left(1 - \frac{80}{255}\right)$ | $\sim\left(1 - \frac{80}{255}\right)$ or $\sim\frac{175}{255}$ |
| 170 | 0 | $+N_A \times \left(1 - \frac{170}{255}\right)$ | $-N_A \times \left(1 - \frac{170}{255}\right)$ | $\sim\left(1 - \frac{170}{255}\right)$ or $\sim\frac{85}{255}$ |
| 254 | 0 | $+N_A \times \left(1 - \frac{254}{255}\right)$ | $-N_A \times \left(1 - \frac{254}{255}\right)$ | $\sim\left(1 - \frac{254}{255}\right)$ or $\sim\frac{1}{255}$ |

FIG. 9

| $W_{i,j}$ | $EDF1_{i,j}$ | $V_{i,j}$ | $e_{i,j}$ | Likelihood of $EDF2_{i,j} \in (EDF2)_W$ |
|---|---|---|---|---|
| 1 | 255 | $+N_A \times \left(\frac{1}{255}\right)$ | $-N_A \times \left(\frac{1}{255}\right)$ | $\sim\left(\frac{1}{255}\right)$ |
| 80 | 255 | $+N_A \times \left(\frac{80}{255}\right)$ | $-N_A \times \left(\frac{80}{255}\right)$ | $\sim\left(\frac{80}{255}\right)$ |
| 170 | 255 | $+N_A \times \left(\frac{170}{255}\right)$ | $-N_A \times \left(\frac{170}{255}\right)$ | $\sim\left(\frac{170}{255}\right)$ |
| 254 | 255 | $+N_A \times \left(\frac{254}{255}\right)$ | $-N_A \times \left(\frac{254}{255}\right)$ | $\sim\left(\frac{254}{255}\right)$ |

FIG. 10

METHOD OF HALFTONE WATERMARKING FOR HIDING MULTI-TONE WATERMARK OR TWO-TONE WATERMARK

BACKGROUND OF THE INVENTION

1. Field of Invention

The present invention is related to a method for hiding a watermark in images, and more specifically, to a method for hiding a watermark in halftone images.

2. Description of Related Art

Digital halftoning is an approach for transforming multi-tone images into two-tone binary images. These halftone images may resemble the original images when viewed from a distance because of the low-pass nature of the human visual system. Halftoning is commonly used in computer printers, as well as in the printing of books, newspapers, and magazines, since the associated printing processes generate only two tones—black (with ink) and white (without ink). The three most popular halftone techniques are ordered dithering, iteration-based reconstruction, and error diffusion (EDF). Of these, ordered dithering provides an efficient method with the poorest visual quality. The iteration-based reconstruction method offers the best visual quality with the lowest efficiency. Relatively, the EDF method provides a proper solution for balancing the visual quality and the coding efficiency. Therefore, currently available printers usually adopt the EDF halftone printing technique.

Please refer to FIG. 1, which is a schematic diagram showing a conventional EDF halftone printing technique, wherein $x_{i,j}$ represents an input value (or termed as pixel value to be processed presently), $v_{i,j}$ represents a gained value (or termed as a corrected input grayscale value), $b_{i,j}$ represents an output value (or termed as the result after comparing the gained value with a threshold value $V_{th}$), $e_{i,j}$ represents an error value produced by deducting the output value $b_{i,j}$ from the gained value $v_{i,j}$, $x'_{i,j}$ represents error diffusion values for gaining the original input pixel value $x_{i,j}$, and h represents weight matrix and is the diffusion kernel of EDF printing technique. For example, an EDF kernel of Floyd can be represented as $$\frac{1}{16}\begin{bmatrix} - & \# & 7 \\ 3 & 5 & 1 \end{bmatrix},$$

an EDF kernel of Jarvis can be represented as $$\frac{1}{48}\begin{bmatrix} - & - & \# & 7 & 5 \\ 3 & 5 & 7 & 5 & 3 \\ 1 & 3 & 5 & 3 & 1 \end{bmatrix},$$

and an EDF kernel of Stucki can be represented as $$\frac{1}{42}\begin{bmatrix} - & - & \# & 8 & 4 \\ 2 & 4 & 8 & 4 & 2 \\ 1 & 2 & 4 & 2 & 1 \end{bmatrix}.$$

The entry marked "−" denotes a pixel in the current row which has already been processed (hence diffusing error to it would be pointless), and entry marked "#" denotes the pixel currently being processed. Each numerical entry shows the weighting of the error value $e_{i,j}$ of the pixel presently being processed to be diffused into neighboring pixels. Generally, the relationships of the values $x_{i,j}$, $x'_{i,j}$, $v_{i,j}$, $b_{i,j}$ and $e_{i,j}$ can be formulated as follows:

$$v_{i,j} = x_{i,j} + x'_{i,j} \tag{1}$$

$$x'_{i,j} = \sum_{m,n \in R} e_{i+m,j+n} \times h_{m,n} \tag{2}$$

$$b_{i,j} = \begin{cases} \text{min\_level}, & \text{if } v_{i,j} < v_{th} \\ \text{max\_level}, & \text{if } v_{i,j} \geq v_{th} \end{cases} \tag{3}$$

$$e_{i,j} = v_{i,j} - b_{i,j}, \tag{4}$$

where $h_{m,n}$ represents the entries of the weight matrix h, min_level is the minimum of two pixel values for displaying the halftone image, max_level is the maximum of the two pixel values for displaying the halftone image, and $v_{th}$ is the threshold value.

For instance, in the case by using Floyd's kernel, the equation (2) can be rewritten as follows:

$$x'_{i,j} = \sum_{m=-1}^{0} \sum_{n=-1}^{1} e_{i+m,j+n} \times h_{1-m,2-n} \tag{5}$$

where the weight matrix h is $$\begin{bmatrix} h_{1,1} & h_{1,2} & h_{1,3} \\ h_{2,1} & h_{2,2} & h_{2,3} \end{bmatrix}.$$

Moreover, if the halftone image is converted from an 8-bit original image, min_level=0 and max_level=255, i.e. $2^8-1$. Accordingly, if the threshold value $v_{th}$ is equal to 128, then the equation (3) can be rewritten as follows:

$$b_{i,j} = \begin{cases} 0, & \text{if } v_{i,j} < 128 \\ 255, & \text{if } v_{i,j} \geq 128 \end{cases} \tag{6}$$

When $b_{i,j}$ is 0, printer prints an ink-dot on a corresponding ideal pixel square; when $b_{i,j}$ is 255, printer does not print an ink-dot on a corresponding ideal pixel square. The weight matrix h diffuses the error value $e_{i,j}$ between the gained value $v_{i,j}$ and the result $b_{i,j}$ into the adjacent pixel values. Further, the next input value $x_{i,j}$ would be accordingly adjusted to obtain a next gained pixel value $v_{i,j}$. During performing error diffusion halftoning, the image is scanned from left to right, top to bottom, and the pixel values are quantized one by one. Each time the quantization error is transferred to the neighboring pixels, the pixels that already have been quantized are not affected.

For example, the pseudo-code of Floyd's kernel can be expressed as follows:

```
for each i          /* loop through each row */
    for each j      /* loop through each column */
        /* performing halftoning */
```

-continued

```
oldpixel = pixel(i, j)
if oldpixel ≧ threshold, then newpixel = max_level
if oldpixel < threshold, then newpixel = min_level
pixel(i, j) = newpixel
/* performing error diffusion */
error_value = oldpixel − newpixel
pixel(i + 1, j) = pixel(i + 1, j) + 7/16 * error_value
pixel(i − 1, j + 1) = pixel(i − 1, j + 1) + 3/16 * error_value
pixel(i, j + 1) = pixel(i, j + 1) + 5/16 * error_value
pixel(i + 1, j + 1) = pixel(i + 1, j + 1) + 1/16 * error_value
    endfor(j)
endfor(i)
```

Recently, secret data hiding in halftone images has become a significant field of research. It is used in many applications, including protecting the ownership rights of an image; preventing the use of an image without permission, and authenticating an image to show that it has not been altered. Numerous methods based on halftones to embed watermarks have been disclosed. For example, Ming Sun Fu and Oscar Chi-Lim Au disclose a method for hiding data in halftone images in their research article "Data hiding in halftone images by stochastic error diffusion" (IEEE ICASSP'01, vol. 3, pp. 1965-1968, 2001). Briefly, the method of Fu and Au generates two halftone images $Y_0$ and $Y_1$ from a single multi-tone image X. The halftone image $Y_0$ is generated by using a standard error diffusion halftoning, and the other halftone image $Y_1$ is generated by using data hiding stochastic error diffusion (DHSED). Information of a hidden watermark H can be obtained by superimposing the two halftone images $Y_0$ and $Y_1$. It is assumed that all of the black pixels of the watermark are defined as a set $H_B$, that all of the white pixels of the watermark are defined as a set $H_W$, and that the pixel currently being processed is represented as (i,j). When (i,j)∈$H_W$, the pixel value $(y_0)_{i,j}$ of the halftone image $Y_0$ is equal to pixel value $(y_1)_{i,j}$ of the halftone image $Y_1$. Alternatively, when (i,j)∈$H_B$, Fu and Au define a (2L+1)×(2L+1) square matrix C with the current pixel (i,j) being the center. If the square matrix C includes black pixels and white pixels, then the white pixels in the square matrix C are indicated as a set D, such that D=C∩$H_B^C$=C∩$H_W$. When (i,j)∉C, the error value $e_{i,j}$ is set to be zero. When the pixel (i,j)∈D the error value $e_{i,j}$ is set to be equal to max(min($v_{i,j}−b_{i,j}$, 127), −127). When the pixel (i,j)∉D, the error value $e_{i,j}$ is equal to $(v_{i,j}−b_{i,j})$. Therefore, $(y_0)_{i,j}=(y_1)_{i,j}$ while (i,j)∈$H_W$, and $(y_1)_{i,j}$ has a slight offset from $(y_0)_{i,j}$ while (i,j)∈$H_B$.

However, the method of Fu and Au has some disadvantages. For example, in order to hide a black pixel of the watermark in the halftone image $Y_1$, it is time-consumed to compare the location of the current pixel (i,j) with location of the black pixel. Further, the contrast of the embedded watermark in the superimposed image is insufficient if the original watermark is a complicated image. Moreover, since the watermark should be a halftone image, the capacity for hiding data is limited to a low level.

SUMMARY OF THE INVENTION

Accordingly, the objective of the present invention is to provide a method for hiding a watermark using halftoning.

The method comprises performing a first error diffusion procedure to convert an original image to a first halftone image according to a threshold value and a weight matrix; setting a noise value; and performing a second error diffusion procedure to transform the original image and the watermark into a second halftone image according to the threshold value, the weight matrix, and the noise value. An offset value of a pixel of the second halftone image at coordinate (i,j) is determined according to a pixel value of a pixel of the first halftone image at coordinate (i,j) and a pixel value of the watermark at coordinate (i,j). The second error diffusion procedure adjusts an original error value of the pixel of the second halftone image at coordinate (i,j) to generate an adjusted error value according to the offset value of the pixel of the second halftone image at coordinate (i,j). The second error diffusion procedure diffuses the adjusted error value to other pixels neighboring the pixel of the second halftone image at coordinate (i,j) according to the weight matrix.

A further object of the present invention is to provide a method for hiding a watermark using halftoning. The method comprises setting a noise value; and performing an error diffusion procedure to transform an original image and the watermark into a halftone image according to a threshold value, a weight matrix, a horizontal value dx, a vertical value dy, and the noise value. An offset value of a pixel of the halftone image at coordinate (i,j) is determined according to a pixel value of a pixel of the halftone image at coordinate (i−dx, j−dy) and a pixel value of the watermark at coordinate (i−dx, j−dy). A parameter i of the coordinate (i,j) is greater than the horizontal value dx, and a parameter j of the coordinate (i,j) is greater than the vertical value dy. The error diffusion procedure adjusts an original error value of the pixel of the halftone image at coordinate (i,j) to generate an adjusted error value according to the offset value of the pixel of the halftone image at coordinate (i,j). The error diffusion procedure diffuses the adjusted error value to other pixels neighboring the pixel of the halftone image at coordinate (i,j) according to the weight matrix. A pixel value of the pixel of the halftone image at coordinate (i,j) is determined to be alternatively equal to one of two pixel values according to the threshold value.

According to an exemplary embodiment of the present invention, the watermark is a halftone image.

According to an exemplary embodiment of the present invention, the offset value of the pixel of the second halftone image at coordinate (i,j) is determined to be alternatively equal to the noise value or a negative of the noise value.

According to an exemplary embodiment of the present invention, the watermark is a grayscale image.

According to an exemplary embodiment of the present invention, a pixel value of the pixel of the second halftone image at coordinate (i,j) is determined to be alternatively equal to one of two pixel values according to the threshold value. The original error value of the pixel of the second halftone image at coordinate (i,j) is equal to a result of subtracting the pixel value of the second halftone image at coordinate (i,j) from a gained value of the second halftone image at coordinate (i,j). The gained value of the second halftone image at coordinate (i,j) is equal to a sum of the offset value of the pixel of the second halftone image at coordinate (i,j) and an input value of the pixel of the second halftone image at coordinate (i,j). The input value of the pixel of the second halftone image at coordinate (i,j) is determined according to a pixel value of a pixel of the original image at coordinate (i,j) and error values diffused from previously processed pixels of the second halftone image prior to the pixel of the second halftone image at coordinate (i,j).

According to an exemplary embodiment of the present invention, the method further comprises superimposing the first halftone image with the second halftone image to generate a superimposed halftone image having an embedded image resembling the watermark.

According to an exemplary embodiment of the present invention, the method further comprises superimposing the first halftone image with the second halftone image to generate a superimposed halftone image; performing a Gaussian filter procedure to convert the superimposed halftone image to a first filtered image and convert the first halftone image to a second filtered image; and generating a restoration image based on the first filtered image and the second filtered image. A pixel value of a pixel of the restoration image at coordinate (i,j) is equal to a sum of a restoration value $H'_{i,j}$ of the restoration image at coordinate (i,j) and an absolute value of a minimum value $H'_{min}$. The restoration value $H'_{i,j}$ is equal to a result of subtracting a pixel value of the second filtered image at coordinate (i,j) from a pixel value of the first filtered image at coordinate (i,j). The minimum value $H'_{min}$ is the minimum of all restoration values of the restoration image.

According to an exemplary embodiment of the present invention, the method further comprises generating a process image by selecting a plurality of pixels of the halftone image at coordinates $$\sum_{x=dx+1}^{P} \sum_{y=dy+1}^{Q} (x, y),$$

wherein P is a number of rows of the pixels of halftone image, and Q is a numbers of columns of the pixels of the halftone image; superimposing the process image with the halftone image to generate a superimposed halftone image; performing a Gaussian filter procedure to convert the superimposed halftone image to a first filtered image and convert the halftone image to a second filtered image; and generating a restoration image based on the first filtered image and the second filtered image. A pixel value of a pixel of the restoration image at coordinate (s,t) is equal to a sum of a restoration value $H'_{s,t}$ of the restoration image at coordinate (s,t) and an absolute value of a minimum value $H'_{min}$. The restoration value $H'_{s,t}$ is equal to a result of subtracting a pixel value of the second filtered image at coordinate (s,t) from a pixel value of the first filtered image at coordinate (s,t). The minimum value is the minimum of all restoration values of the restoration image.

In order to make the aforementioned and other objects, features and advantages of the present invention comprehensible, several preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 9, which is a table used to exemplary explain the likelihood of the pixel of a second halftone image around coordinate (i,j) is a black pixel.

FIG. 10 is a table used to exemplary explain the likelihood of the pixel of the second halftone image at (i,j) is a white pixel.

DESCRIPTION OF EMBODIMENTS

Figure 1:
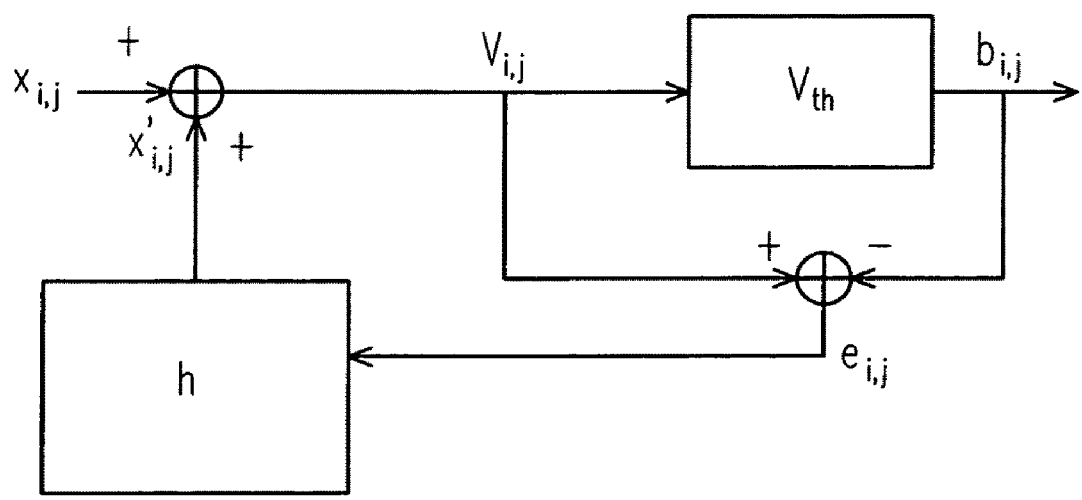
FIG. 1 is a schematic diagram showing a conventional EDF halftone printing technique.
Figure 2:
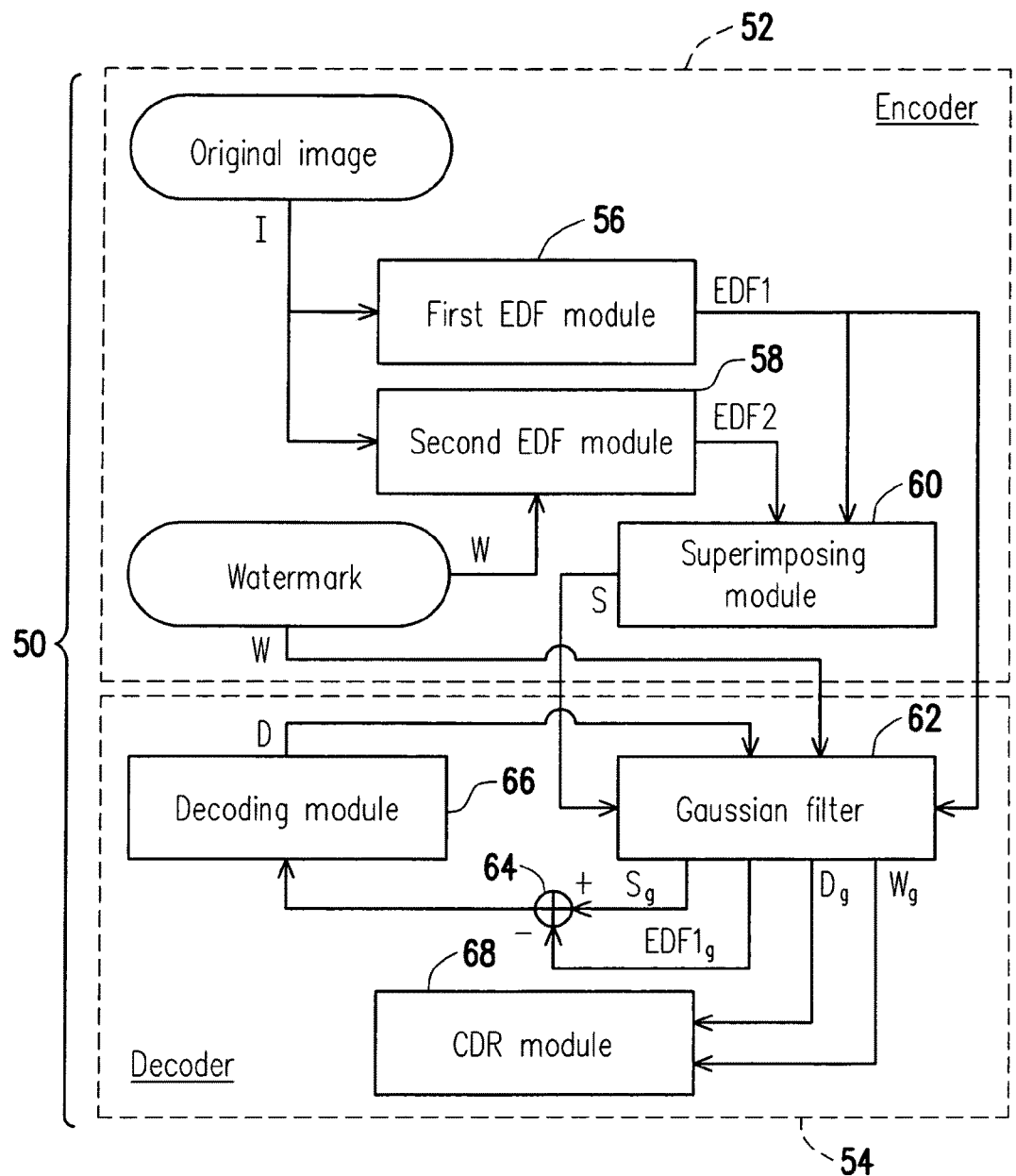
FIG. 2 is a functional block diagram of an EDF halftoning module according to a first embodiment of the present invention.

Referring to FIG. 2, which is a functional block diagram of an EDF halftoning module 50 according to a first embodiment of the present invention. The EDF halftoning module 50 may be software/firmware or hardware/circuit. The EDF halftoning module 50 has an encoder 52 and a decoder 54. The encoder 52 has a first EDF module 56 for performing a first error diffusion procedure to convert an original image I to a first halftone image EDF1 according to a threshold value $v_{th}$ and a weight matrix h. The encoder 52 further has a second EDF module 58 for performing a second error. diffusion procedure to transform the original image I and a watermark W into a second halftone image EDF2 according to the threshold value $v_{th}$, the weight matrix h, and a noise value $N_A$, where the noise value $N_A$ is a positive number. In the embodiment, the watermark W is a halftone image, and the threshold value $v_{th}$ is equal to 128. A superimposing module 60 of the encoder 52 is used to superimpose the first halftone image EDF1 and the second halftone image EDF2 to generate a superimposed halftone image S. The decoder 54 has a Gaussian filter 62, a subtractor 64, a decoding module 66, and a correct decode rate (CDR) module 68. The Gaussian filter 62 performs a Gaussian filter procedure to convert the superimposed halftone image S to a first filtered image $S_g$ and convert the first halftone image EDF1 to a second filtered image EDF1$_g$. The subtractor 64 subtracts the pixel values of the second filtered image EDF1$_g$ from the pixels values of the first filtered image $S_g$ and output the results to the decoding module 66 such that the decoding module 66 generates a restoration image D according to the results received from the subtractor 64. The restoration image D resembles the watermark W. In the embodiment, the original image I is a rectangular image, which has P rows and Q columns of pixels. P and Q are positive integers greater than 1. Since the first halftone image EDF1 and the second halftone image EDF2 are transformed from the original image I, both the dimensions of the first and second halftone image EDF1 and EDF2 are equal to (P×Q). The dimension of the watermark W may be identical with or less than that of the original image I. If it is assumed that the dimension of the watermark W is (X×Y), then $1 \leq X \leq P$ and $1 \leq Y \leq Q$. Moreover, in the document, the suffix letters i and j of each variables in the document stand for some value at coordinate (i,j). For example, $x_{i,j}$ is the input value of a pixel at coordinate (i,j), and $W_{i,j}$ is a pixel value of the watermark W at coordinate (i,j).

Figure 3:
FIG. 3 is an image of an exemplary watermark to be hidden.
Figure 4:
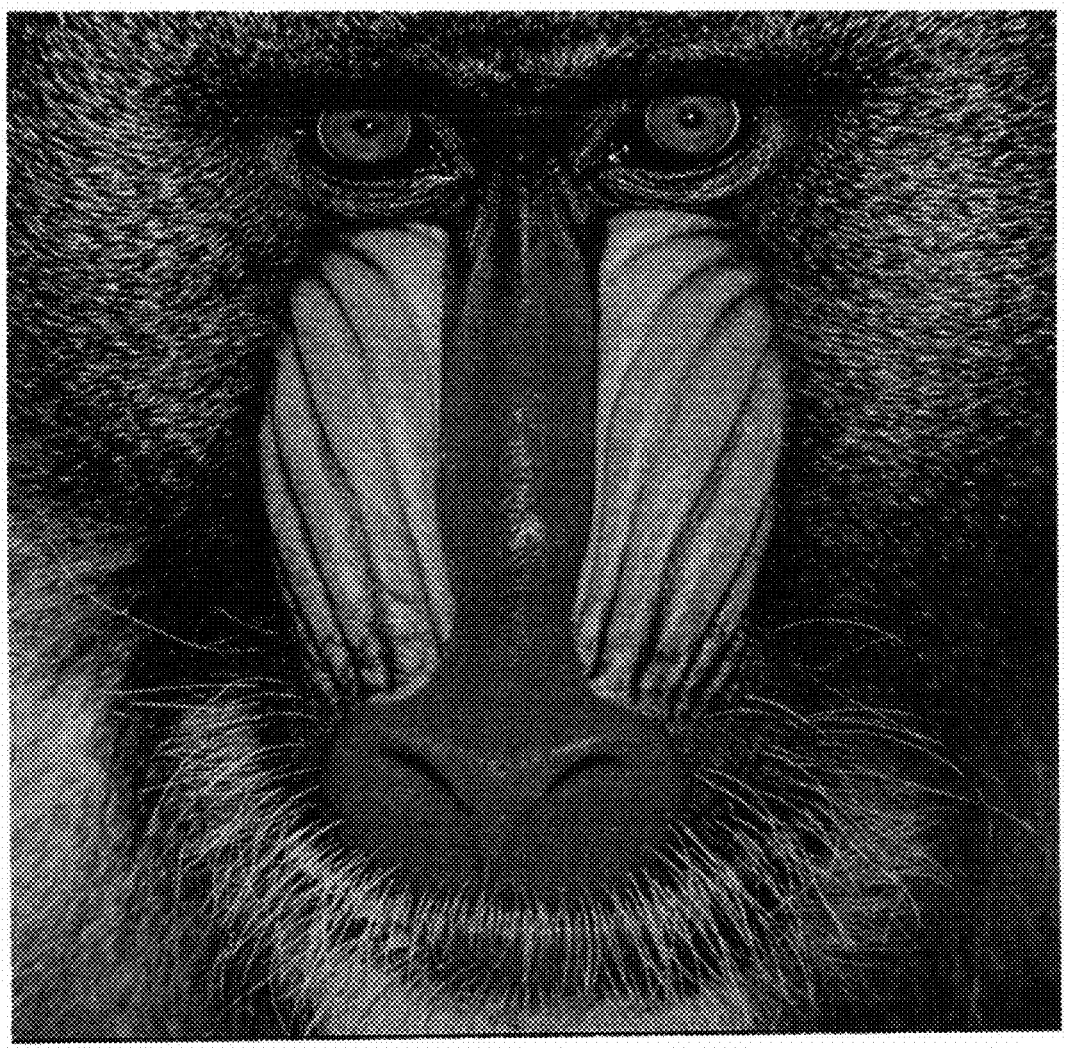
FIG. 4 is an exemplary first halftone image produced by the first EDF module shown in FIG. 2 according to an embodiment of the present invention.
Figure 5:
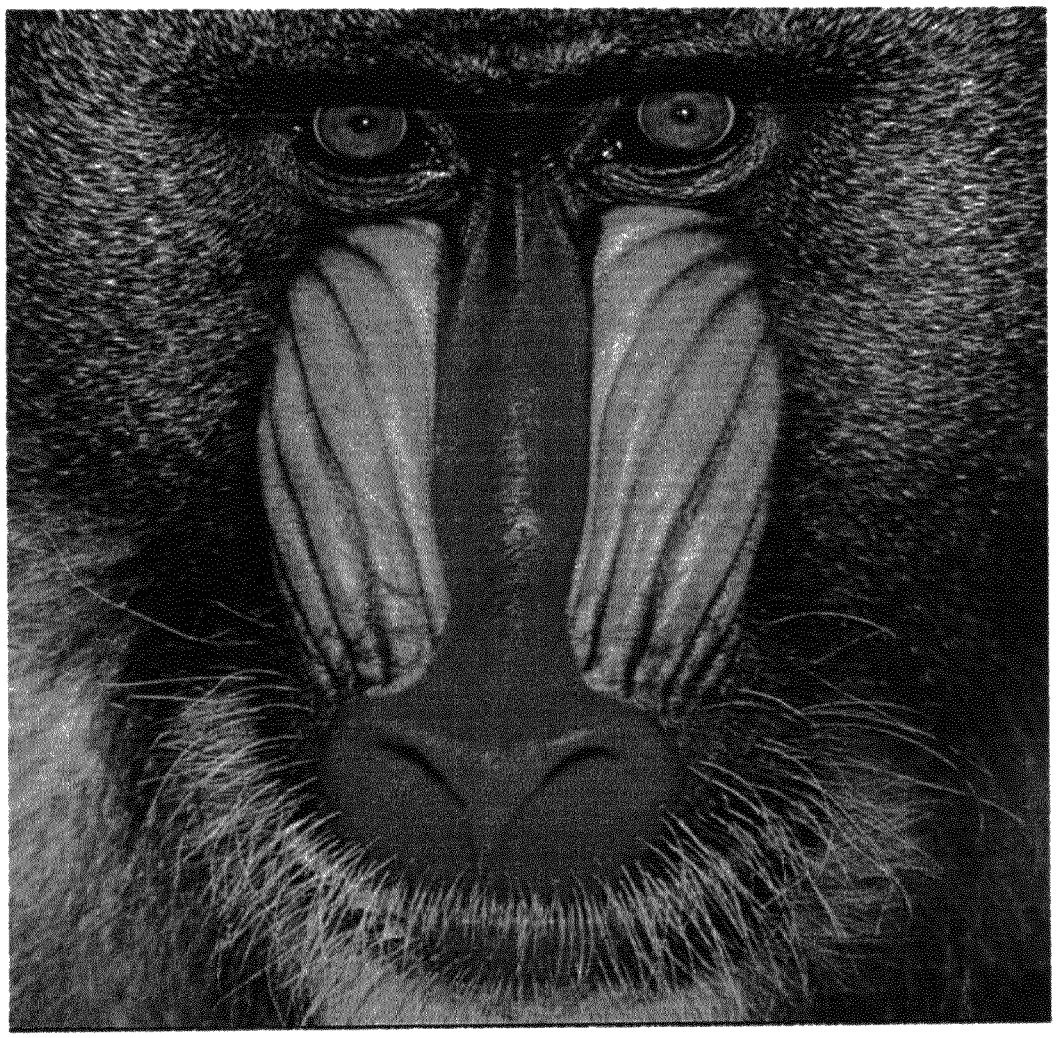
FIG. 5 is an exemplary second halftone image, which is produced by the second EDF module shown in FIG. 2 and contains hidden information of the watermark shown in FIG. 3, according to the embodiment of the present invention.
Figure 6:
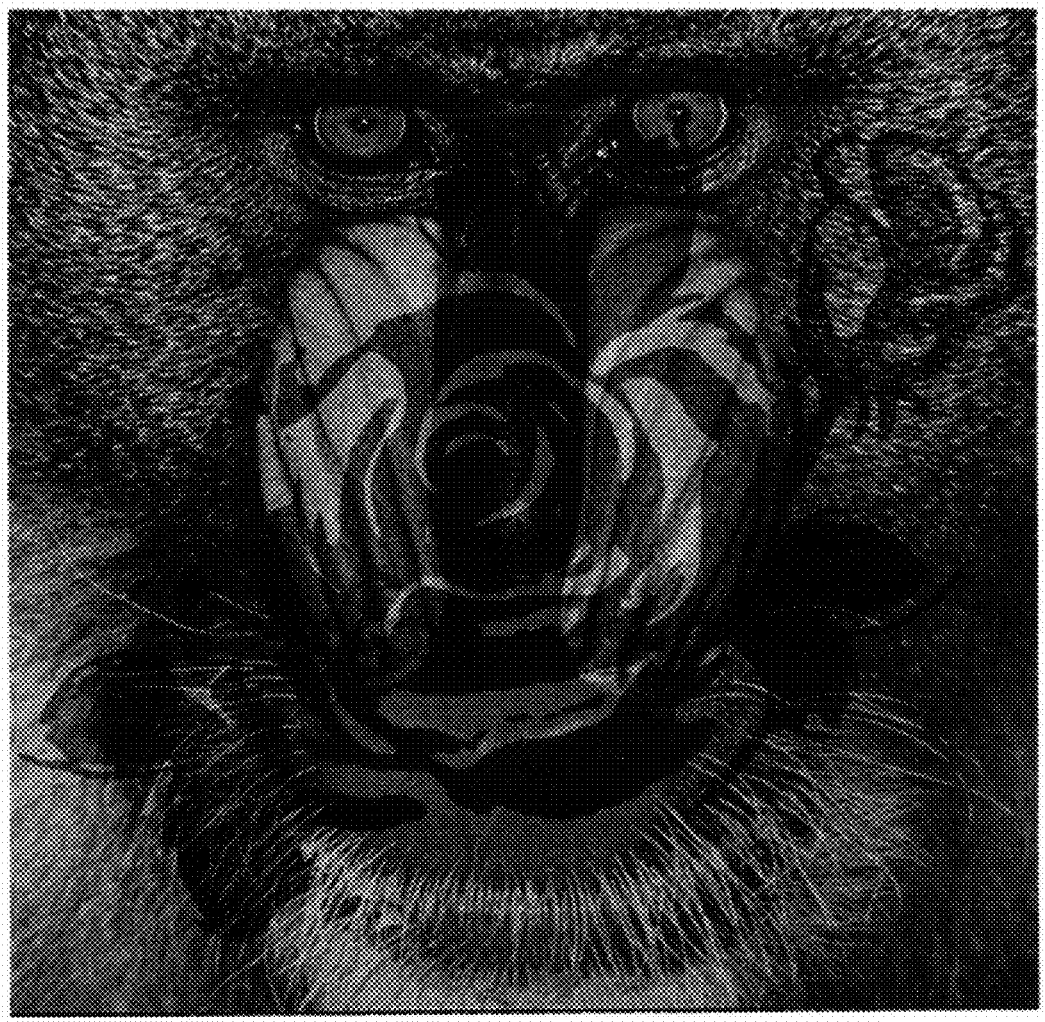
FIG. 6 is a superimposed halftone image produced by superimposing the first halftone image shown in FIG. 3 with the second halftone image shown in FIG. 4 via the superimposing module shown in FIG. 2.

Please refer to FIGS. 3 to 6. FIG. 3 is an image of an exemplary watermark to be hidden. FIG. 4 is an exemplary first halftone image produced by the first EDF module 56 in FIG. 2. FIG. 5 is an exemplary second halftone image, which is produced by the second EDF module 58 in FIG. 2 and contains hidden information of the watermark shown in FIG. 3. FIG. 6 is a superimposed halftone image produced by superimposing the first halftone image and the second halftone image shown in FIGS. 3 and 4 via the superimposing module 60 in FIG. 2. It can be seen that the superimposed halftone image shown in FIG. 6 has an embedded image that resembles the watermark shown in FIG. 3.

Figure 7:
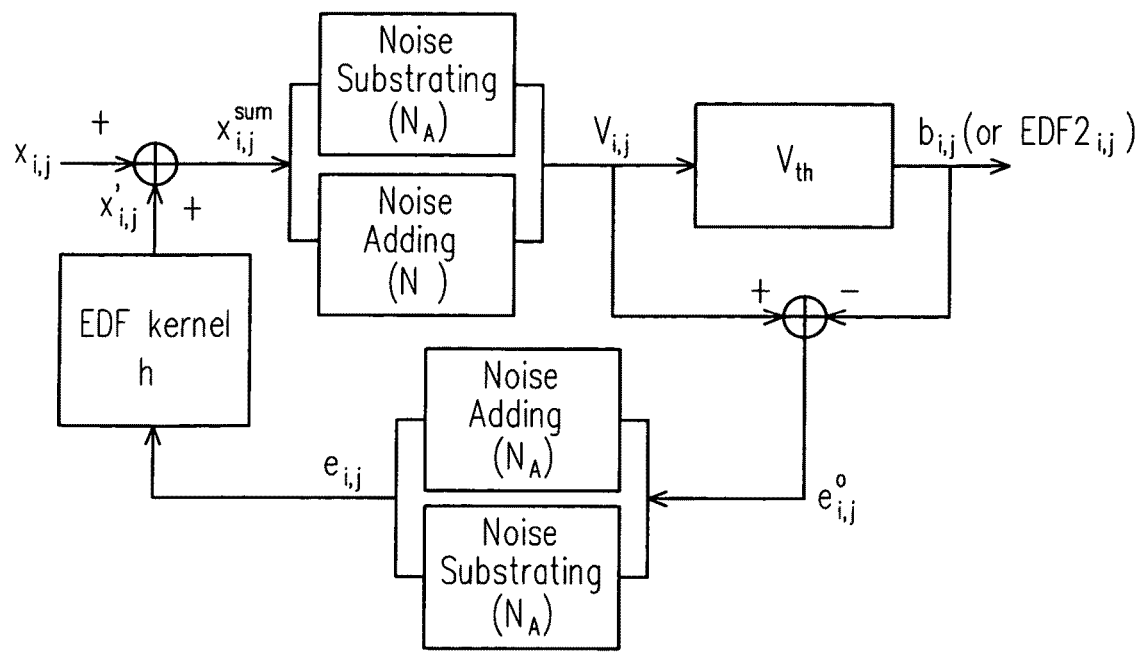
FIG. 7 is a schematic diagram showing a loop of EDF halftoning, which executed by the second EDF module shown in FIG. 2, of the present invention.

The first error diffusion procedure performed by the first EDF module 56 follows the rules of the prior art. That is, the above equations (1)-(4) can be used to convert the original image I to the first halftone image EDF1. Differently, in order to execute the second error diffusion procedure, the additive noise value $N_A$ is set. Referring to FIG. 7, which is a schematic diagram showing a loop of EDF halftoning executed by the second EDF module 58 shown in FIG. 2. Similarly, $x_{i,j}$ represents an input value (or termed as pixel value to be processed presently), $v_{i,j}$ represents a gained value (or termed as a corrected input grayscale value), $b_{i,j}$ represents an output value of the second halftone image EDF2 at coordinate (i,j) (or termed as the result after comparing the gained value with a threshold value $v_{th}$), $e_{i,j}$ represents an adjusted error value produced by calculating a result of an original error value $e_{i,j}^o$ and the noise value $N_A$, $x'_{i,j}$ represents error diffusion values for gaining the original input pixel value $x_{i,j}$, and h represents weight matrix and is the EDF kernel. The weight matrix h may be Floyd' EDF kernel, Jarvis' EDF kernel, Stucki's EDF kernel, or one of other various EDF kernels. The noise value $N_A$ is used to compensate a sum $x_{i,j}^{sum}$ of the original input value $x_{i,j}$ and the error diffusion values $x'_{i,j}$ and to compensate the original error value $e_{i,j}^o$. In the document, the sum $x_{i,j}^{sum}$ is defined as an input value for the second error diffusion procedure executed by the second EDF module 58. The input value $x_{i,j}^{sum}$ is equal to $(x_{i,j}+x'_{i,j})$. Moreover, all of the black pixels of the watermark W are defined as a set $W_B$, and all of the white pixels of the watermark W are defined as a set $W_W$. Further, all of the black pixels of the first halftone image EDF1 are defined as a set (EDF1)$_B$, and all of the white pixels of the first halftone image EDF1 are defined as a set (EDF1)$_W$. Generally, the relationships of the values $x_{i,j}$, $x'_{i,j}$, $x_{i,j}^{sum}$, $N_A$, $v_{i,j}$, $b_{i,j}$, $e_{i,j}^o$ and $e_{i,j}$ can be formulated as follows:

$$v_{i,j} = \begin{cases} x_{i,j}^{sum} - N_A, & \text{if } \left\{ \begin{bmatrix} W_{i,j} \in (W)_W \text{ and} \\ EDF1_{i,j} \in (EDF1)_W \end{bmatrix} \text{ or } \begin{bmatrix} W_{i,j} \in (W)_B \text{ and} \\ EDF1_{i,j} \in (EDF1)_B \end{bmatrix} \right\} \\ x_{i,j}^{sum} + N_A, & \text{if } \left\{ \begin{bmatrix} W_{i,j} \in (W)_B \text{ and} \\ EDF1_{i,j} \in (EDF1)_W \end{bmatrix} \text{ or } \begin{bmatrix} W_{i,j} \in (W)_W \text{ and} \\ EDF1_{i,j} \in (EDF1)_B \end{bmatrix} \right\} \end{cases} \quad (7)$$

$$x_{i,j}^{sum} = x_{i,j} + x'_{i,j} \quad (8)$$

$$x'_{i,j} = \sum_{m,n \in R} \sum e_{i+m,j+n} \times h_{m,n} \quad (9)$$

$$b_{i,j} = \begin{cases} \text{min\_level} & \text{if } v_{i,j} < v_{th} \\ \text{max\_level} & \text{if } v_{i,j} \geq v_{th} \end{cases} \quad (10)$$

$$e_{i,j}^o = v_{i,j} - b_{i,j} \quad (11)$$

$$e_{i,j}^o = \begin{cases} e_{i,j}^o - N_A, & \text{if } \left\{ \begin{bmatrix} W_{i,j} \in (W)_W \text{ and} \\ EDF1_{i,j} \in (EDF1)_W \end{bmatrix} \text{ or } \begin{bmatrix} W_{i,j} \in (W)_B \text{ and} \\ EDF1_{i,j} \in (EDF1)_B \end{bmatrix} \right\} \\ e_{i,j}^o + N_A, & \text{if } \left\{ \begin{bmatrix} W_{i,j} \in (W)_B \text{ and} \\ EDF1_{i,j} \in (EDF1)_W \end{bmatrix} \text{ or } \begin{bmatrix} W_{i,j} \in (W)_W \text{ and} \\ EDF1_{i,j} \in (EDF1)_B \end{bmatrix} \right\} \end{cases}, \quad (12)$$

where EDF1$_{i,j}$ is the pixel value of a pixel of the first halftone image EDF1 at coordinate (i,j), and $W_{i,j}$ is the pixel value of the watermark W at coordinate (i,j), $h_{m,n}$ represents the entries of the weight matrix h, min_level is the minimum of two pixel values for displaying the halftone image, max_level is the maximum of the two pixel values for displaying the halftone image, and $v_{th}$ is the threshold value. In the document, a pixel having pixel value of min_level is defined as a black pixel, and a pixel having pixel value of max_level is defined as a white pixel. Moreover, because $b_{i,j}$ represents the output value of the second halftone image EDF2 at coordinate (i,j), the pixel value EDF2$_{i,j}$ of the pixel of the second halftone image EDF2 at coordinate (i,j) is equal to the output value $b_{i,j}$. Therefore, the equation (10) can be rewritten as follow:

$$EDF2_{i,j} = \begin{cases} \text{min\_level}, & \text{if } v_{i,j} < v_{th} \\ \text{max\_level}, & \text{if } v_{i,j} \geq v_{th} \end{cases} \quad (13)$$

Simply, the equations (7) and (12) can be respectively rewritten as follow:

$$v_{i,j} = \begin{cases} x_{i,j}^{sum} + N_A, & \text{if } W_{i,j} = EDF1_{i,j} \\ x_{i,j}^{sum} - N_A, & \text{if } W_{i,j} \neq EDF1_{i,j} \end{cases} \quad (14)$$

$$e_{i,j} = \begin{cases} e_{i,j}^{o} + N_A, & \text{if } W_{i,j} = EDF1_{i,j} \\ e_{i,j}^{o} - N_A, & \text{if } W_{i,j} \neq EDF1_{i,j} \end{cases} \quad (15)$$

According to the equations (14) and (15), the gained value $v_{i,j}$ is alternatively equal to ($x_{i,j}^{sum}+N_A$) or ($x_{i,j}^{sum}-N_A$), and the adjusted error value $e_{i,j}$ is alternatively equal to ($e_{i,j}^{o}-N_A$) or ($e_{i,j}^{o}+N_A$). The adjusted error value $e_{i,j}$ is equal to ($e_{i,j}^{o}-N_A$) when the gained value $v_{i,j}$ is equal to ($x_{i,j}^{sum}+N_A$), and the adjusted error value $e_{i,j}$ is equal to ($e_{i,j}^{o}+N_A$) when the gained value $v_{i,j}$ is equal to ($x_{i,j}^{sum}-N_A$). Both the gained value $v_{i,j}$ and the adjusted error value $e_{i,j}$ are determined according to the pixel value $W_{i,j}$ of the watermark W and the pixel value EDF1$_{i,j}$ of the pixel of the first halftone image EDF1. In order to simply the description of the present invention, a variable $O_{i,j}$ is added. The variable $O_{i,j}$ indicates an offset value of the pixel of the second halftone image EDF2 at coordinate (i,j). In the embodiment, the offset value $O_{i,j}$ is equal to the noise value $N_A$ if the pixel value $W_{i,j}$ of the watermark W is equal to the pixel value EDF1$_{i,j}$ of the first halftone image EDF1. Alternatively, the offset value $O_{i,j}$ is equal to a negative of the noise value $N_A$ if the pixel value $W_{i,j}$ of the watermark W is different from the pixel value EDF1$_{i,j}$ of the pixel of the first halftone image EDF1. For example, if both the pixels of the first halftone image EDF1 and the watermark W at coordinate (i,j) are black or white pixels, the offset value $O_{i,j}$ is equal to the noise value $N_A$. Moreover, if the pixel of the first halftone image EDF1 at coordinate (i,j) is a black pixel and the pixel of the watermark W at coordinate (i,j) is a white pixel, the offset value $O_{i,j}$ is equal to ($-N_A$). Similarly, if the pixel of the first halftone image EDF1 at coordinate (i,j) is a white pixel and the pixel of the watermark W at coordinate (i,j) is a black pixel, the offset value $O_{i,j}$ is also equal to ($-N_A$). Consequently, the offset value $O_{i,j}$ is defined as follows:

$$O_{i,j} = \begin{cases} N_A, & \text{if } W_{i,j} = EDF1_{i,j} \\ -N_A, & \text{if } W_{i,j} \neq EDF1_{i,j} \end{cases} \quad (16)$$

It should be noted that the negative of the noise value $N_A$ is a negative number because the noise value $N_A$ is set to be a positive number.

By using the offset value $O_{i,j}$, the equations (7) and (14) can be simplified as:

$$v_{i,j} = x_{i,j}^{sum} + O_{i,j} \quad (17)$$

And, the equations (12) and (15) can be simplified as:

$$e_{i,j} = e_{i,j}^{o} - O_{i,j} \quad (18)$$

Figure 8:
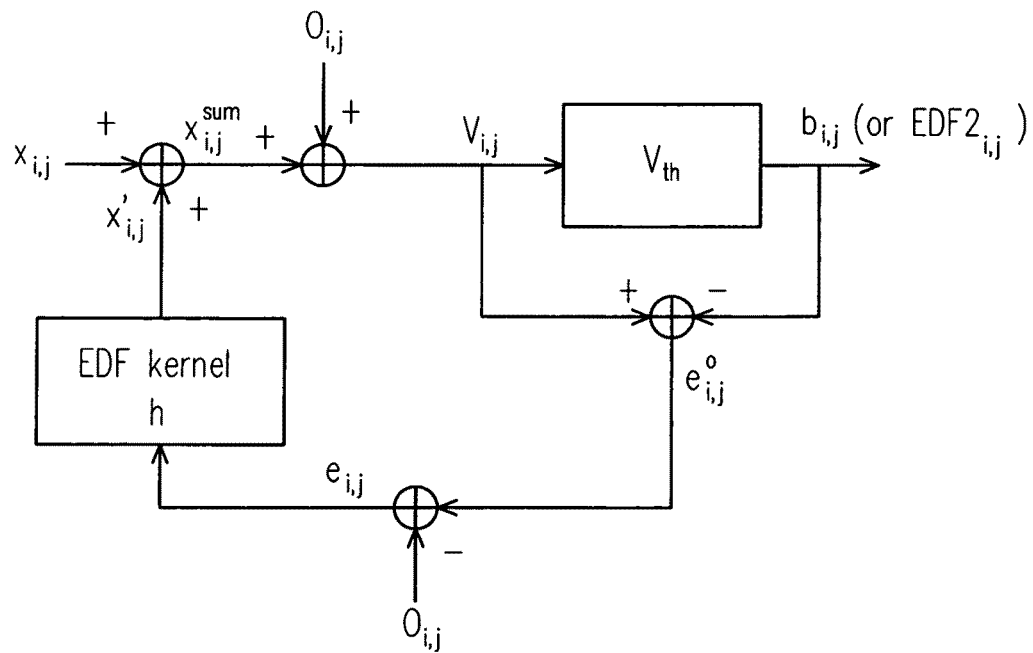
FIG. 8 is an equivalent diagram of FIG. 7.

Consequently, the loop of EDF halftoning in FIG. 7 can be simplified as shown in FIG. 8.

Taking Floyd's kernel for example, the equation (9) can be rewritten as follows:

$$x'_{i,j} = \sum_{m=0}^{2} \sum_{n=0}^{2} e_{i+m,j+n} \times h_{m,n} \quad (19)$$

Similarly, if the original image I is an 8-bit image, min_level=0 and max_level=255. Accordingly, when the threshold value $v_{th}$ is set to be 128, then the equation (13) can be rewritten as follows:

$$EDF2(i,j) = \begin{cases} 0, & \text{if } v_{i,j} < 128 \\ 255, & \text{if } v_{i,j} \geq 128 \end{cases} \quad (20)$$

According to the equation (13), the greater is the gained value $v_{i,j}$, the greater is the probability of pixel value EDF2$_{i,j}$ of the second halftone image EDF2 equal to max_level. Therefore, when the pixel value $W_{i,j}$ of the watermark W is equal to the pixel value EDF1$_{i,j}$ of the first halftone image EDF1, the offset value $O_{i,j}$ is positive such that the gained value $v_{i,j}$ is increased. Consequently, the probability of pixel value EDF2$_{i,j}$ equal to max_level is increased, and, relatively, the probability of pixel value EDF2$_{i,j}$ equal to min_level is decreased. Alternatively, when the pixel value $W_{i,j}$ of the watermark W is different form the pixel value EDF1$_{i,j}$ of the first halftone image EDF1, the offset value $O_{i,j}$ is negative such that the gained value $v_{i,j}$ is decreased. Therefore, the probability of the pixel value EDF2$_{i,j}$ equal to max_level is decreased, and the probability of pixel value EDF2$_{i,j}$ equal to min_level is relatively increased.

Moreover, because the adjusted error value $e_{i,j}$ is a result of subtracting the offset value $O_{i,j}$ from the original error value $e_{i,j}^{o}$, the adjusted error value $e_{i,j}$ is less than the original error value $e_{i,j}^{o}$ if the offset value $O_{i,j}$ is positive while the pixel value $W_{i,j}$ is equal to the pixel value EDF1$_{i,j}$. Alternatively, when the pixel value $W_{i,j}$ is different from the pixel value EDF1$_{i,j}$, the offset value $O_{i,j}$ is negative such that the adjusted error value $e_{i,j}$ is greater than the original error value $e_{i,j}^{o}$. Because the adjusted error value $e_{i,j}$ will be diffused into neighboring pixels of the pixel at coordinate (i,j), the pixel values of the neighboring pixels around coordinate (i,j) are influenced by the offset value $O_{i,j}$ and the original error value $e_{i,j}^{o}$. Consequently, the possibility of the pixels around coordinate (i,j) equal to the max_level is decreased as the offset value $O_{i,j}$ is positive while the pixel value $W_{i,j}$ is equal to the pixel value EDF1$_{i,j}$. Alternatively, the possibility of the pixels around coordinate (i,j) equal to the max_level is increased as the offset value $O_{i,j}$ is negative while the pixel value $W_{i,j}$ is different from the pixel value EDF1$_{i,j}$.

Because the superimposed halftone image S is generated by superimposing the first halftone image EDF1 and the second halftone image EDF2, if at least one of the pixels of the first halftone image EDF1 and the second halftone image EDF2 at coordinate (i,j) is a black pixel, the pixel of the superimposed halftone image S at coordinate (i,j) is definitely a black pixel. Accordingly, the pixel of the superimposed halftone image S at coordinate (i,j) is a white pixel only when both the pixels of the first halftone image EDF1 and the second halftone image EDF2 at coordinate (i,j) are white pixels. Moreover, because the first halftone image EDF1 and the watermark W are halftone images, one of four situations will occur when the pixel value $EDF2_{i,j}$ is determined according to the pixel value $EDF1_{i,j}$ of the first halftone image EDF1 and the pixel value $W_{i,j}$ of the watermark W. The first situation occurs when $[W_{i,j} \in (W)_B$ and $EDF1_{i,j} \in (EDF1)_W]$. Because the pixel of the watermark W at coordinate (i,j) is a black pixel, it is desired that the pixel of the superimposed halftone image S at coordinate (i,j) is also a black pixel. Therefore, the offset value $O_{i,j}$ is set to be $(-N_A)$ to increase the possibility of the pixel of the second halftone image EDF2 at coordinate (i,j) be a black pixel such that a black pixel of the superimposed halftone image S at coordinate (i,j) probably can be obtained by superimposing the pixels of the first halftone image EDF1 and the second halftone image EDF2 at coordinate (i,j). The second situation occurs when $[W_{i,j} \in (W)_W$ and $EDF1_{i,j} \in (EDF1)_W]$. Because the pixel of the watermark W at coordinate (i,j) is a white pixel, it is desired that the pixel of the superimposed halftone image S at coordinate (i,j) is also a white pixel. Therefore, the offset value $O_{i,j}$ is set to be $N_A$ to increase the possibility of the pixel of the second halftone image EDF2 at coordinate (i,j) be a white pixel such that a white pixel of the superimposed halftone image S at coordinate (i,j) probably can be obtained by superimposing the pixels of the first halftone image EDF1 and the second halftone image EDF2 at coordinate (i,j). The third situation occurs when $[W_{i,j} \in (W)_W$ and $EDF1_{i,j} \in (EDF1)_B]$. Because the superimposed halftone image S at coordinate (i,j) is definitely a black pixel due to the black pixel of the first halftone image EDF1 at coordinate (i,j), it is desired that the neighboring pixels of the second halftone image EDF2 around coordinate (i,j) are white pixels to compensate the black pixel of the superimposed halftone image S at coordinate (i,j). Therefore, the offset value $O_{i,j}$ is set to be $(-N_A)$ to increase the possibility of the pixels of the second halftone image EDF2 around coordinate (i,j) be white pixels. The fourth situation occurs when $[W_{i,j} \in (W)_B$ and $EDF1_{i,j} \in (EDF1)_B]$. The superimposed halftone image S at coordinate (i,j) is definitely a black pixel because the pixel of the first halftone image EDF1 at coordinate (i,j) is a black pixel. It can be seen from FIG. 5 that the possibility of a black pixel of the watermark W adjacent to a black pixel is extremely greater than that of a black pixel of the watermark W adjacent to a white pixel. Therefore, the offset value $O_{i,j}$ is set to be $N_A$ to increase the possibility of the pixels of the second halftone image EDF2 around coordinate (i,j) be black pixels. It should be noted that, since a corresponding offset value $O_{i,j}$ is added for each input value $x_{i,j}^{sum}$ of the second halftone image EDF2, the corresponding offset value $O_{i,j}$ is subtracted from each original error value $e_{i,j}^o$ of the second halftone image EDF2 to maintain overall averaged pixel values.

Additionally, since the dimension of the watermark W may be less than that of the original image I, it should be noted that a pixel of the watermark W at coordinate (i,j) may not exist while a pixel of the original image I at coordinate (i,j) exists. In such case, since the watermark W is a halftone image, the pixel value of the watermark W at coordinate (i,j) is set to be equal to maximum of two pixel values for displaying the watermark W. Therefore, when a pixel of the watermark W does not exist at coordinate (i,j), the pixel value $W_{i,j}$ of the watermark W is equal to max_level such that a white pixel of the watermark W seems existing at coordinate (i,j). Alternatively, if a pixel of the watermark W exists at coordinate (i,j), the pixel value $W_{i,j}$ of the watermark W is equal the pixel value of the pixel of the watermark W at coordinate (i,j). For example, if the pixel at coordinate (37,125) of the watermark W with pixel value of 0 exists, a pixel value $W_{37,125}$ of the watermark W is equal to 0.

In an embodiment of the present invention, the pseudocode of the second error diffusion procedure executed by the second EDF module 58, which uses Floyd's kernel, can be expressed as follows:

```
for each i                    /* loop through each row */
    for each j                /* loop through each column */
        noise_value = N_A     /* setting noise value */
        /* determining the offset value */
        if W_{i,j} = EDF1_{i,j}, then
                offset_value = positive(noise_value)
        if W_{i,j} ≠ EDF1_{i,j}, then
                offset_value = negative(noise_value)
        /* performing halftoning for current pixel of EDF2 */
        oldpixel = pixel(i, j) + offset_value
        if oldpixel ≥ threshold, then newpixel = max_level
        if oldpixel < threshold, then newpixel = min_level
        pixel(i, j) = newpixel
        /* performing error diffusion for EDF2 */
        error_value = oldpixel − newpixel − offset_value
        pixel(i+1, j) = pixel(i+1, j) + 7/16 * error_value
        pixel(i−1, j+1) = pixel(i−1, j+1) + 3/16 * error_value
        pixel(i, j+1) = pixel(i, j+1) + 5/16 * error_value
        pixel(i+1, j+1) = pixel(i+1, j+1) + 1/16 * error_value
    endfor (j)
endfor (i)
```

In another embodiment of the present invention, the watermark W is a grayscale image (or termed as a multi-tone image), which has a plurality of gray levels. For simplicity's sake, the maximum pixel value for displaying the watermark W is also defined as max_level, the minimum pixel value for displaying the watermark W is also defined as min_level. A difference between the maximum pixel value max_level and the minimum pixel value min_level is defined as $N_{diff}$. Therefore, $N_{diff}$=(max_level−min_level). For example, in the case by using an 8-bit image as the watermark W, the total number of the gray levels for displaying the watermark W is 256, max_level is equal to 255, min_level is equal to 0, and the value of the difference $N_{diff}$ is 255. In the embodiment, the loop of EDF halftoning in FIG. 8 is also used to describe the algorithm of the present invention, and the EDF halftoning module 50 in FIG. 2 is also used to generate a first halftone image EDF1 and a second halftone image EDF2. However, since the watermark W is grayscale image rather than a halftone image, the equations (7), (12) and (16) are slightly modified while the equations (8)-(11), (13), (17) and (18) are not changed. That is, $$O_{i,j} = \begin{cases} N_A \times \left(1 - \dfrac{W_{i,j}}{N_{diff}}\right), & \text{if } EDF1_{i,j} \in (EDF1)_B \\ N_A \times \left(\dfrac{W_{i,j}}{N_{diff}}\right), & \text{if } EDF1_{i,j} \in (EDF1)_W \end{cases} \quad (21)$$

$$v_{i,j} = x_{i,j}^{sum} + O_{i,j} \quad (22)$$

$$= \begin{cases} x_{i,j}^{sum} + N_A \times \left(1 - \dfrac{W_{i,j}}{N_{diff}}\right), & \text{if } EDF1_{i,j} \in (EDF1)_B \\ x_{i,j}^{sum} + N_A \times \left(\dfrac{W_{i,j}}{N_{diff}}\right), & \text{if } EDF1_{i,j} \in (EDF1)_W \end{cases}$$

-continued $$e_{i,j} = x_{i,j}^{sum} - O_{i,j} \quad (23)$$

$$= \begin{cases} e_{i,j}^o - N_A \times \left(1 - \dfrac{W_{i,j}}{N_{diff}}\right), & \text{if } EDF1_{i,j} \in (EDF1)_B \\ e_{i,j}^o - N_A \times \left(\dfrac{W_{i,j}}{N_{diff}}\right), & \text{if } EDF1_{i,j} \in (EDF1)_W \end{cases}$$

Briefly, in the embodiment, the first EDF module 56 performs a first error diffusion procedure to convert the original image I to the first halftone image EDF1 according to the equations (1)-(4), and the second EDF module 58 performs a second error diffusion procedure to transform the original image I and the grayscale watermark W into the second halftone image EDF2 according to the equations (8)-(11), (13), (17), (18) and (21)-(23).

In the document, all of the black pixels of the second halftone image EDF2 are defined as a set $(EDF2)_B$, all of the white pixels of the second halftone image EDF2 are defined as a set $(EDF2)_W$, and a pixel of the second halftone image EDF2 neighboring the pixel at coordinate (i,j) is defined as $EDF2_{i,j}^A$. As described previously, the pixel of the superimposed halftone image S at coordinate (i,j) is definitely a black pixel if at least one of the pixels of the first halftone image EDF1 and the second halftone image EDF2 at coordinate (i,j) is a black pixel, and the pixel of the superimposed halftone image S at coordinate (i,j) is a white pixel only when both the pixels of the first halftone image EDF1 and the second halftone image EDF2 at coordinate (i,j) are white pixels. Accordingly, when the pixel $EDF1_{i,j}$ of the first halftone image EDF1 at coordinate (i,j) is a black pixel, i.e. $EDF1_{i,j} \in (EDF1)_B$, it is desired that the neighboring pixels of the second halftone image EDF2 around coordinate (i,j) can properly compensate the pixel $EDF2_{i,j}$ of the second halftone image EDF2 at coordinate (i,j). Therefore, the offset value $O_{i,j}$ is set to be $$\left(N_A \times \left(1 - \dfrac{W_{i,j}}{N_{diff}}\right)\right)$$

such that the pixel value of the pixel $EDF2_{i,j}^A$ can be adjusted to properly compensate the pixel $EDF2_{i,j}$ when the adjusted error value $e_{i,j}$ is obtained by subtracting the offset value $O_{i,j}$ from the original error value $e_{i,j}^o$. Referring to FIG. 9, which is a table used to exemplary explain the likelihood of the pixel $EDF2_{i,j}^A \in (EDF2)_B$. It is obvious that greater pixel value $W_{i,j}$ results in less offset value $O_{i,j}$, and that less offset value $O_{i,j}$ results in less likelihood of the pixel $EDF2_{i,j}^A \in (EDF2)_B$. Therefore, the less is the pixel value $W_{i,j}$, the greater is the likelihood of the pixel $EDF2_{i,j}^A \in (EDF2)_B$.

Relatively, when the pixel $EDF1_{i,j}$ of the first halftone image EDF1 at coordinate (i,j) is a white pixel, i.e. $EDF1_{i,j} \in (EDF1)_W$, it is desired that the pixel value $EDF2_{i,j}$ of the second halftone image EDF2 can properly indicate the pixel value $W_{i,j}$ of the watermark W. Therefore, the offset value $O_{i,j}$ is set to be $$\left(N_A \times \dfrac{W_{i,j}}{N_{diff}}\right)$$

such that the pixel value $EDF2_{i,j}$ can be adjusted to properly indicate the pixel value $W_{i,j}$ when the gained value $v_{i,j}$ is obtained by adding the offset value $O_{i,j}$ to the input value $x_{i,j}^{sum}$. Referring to FIG. 10, which is a table used to exemplary explain the likelihood of the pixel $EDF2_{i,j} \in (EDF2)_W$. It is obvious that greater pixel value $W_{i,j}$ results in greater offset value $O_{i,j}$, and that greater offset value $O_{i,j}$ results in greater likelihood of the pixel $EDF2_{i,j} \in (EDF2)_W$. Therefore, the greater is the pixel value $W_{i,j}$, the greater is the likelihood of the pixel $EDF2_{i,j} \in (EDF2)_W$.

Accordingly, a grayscale watermark can be hidden in the halftone images such that the capacity for hiding data according to the present invention is increased.

In an embodiment of the present invention, the pseudo-code of the second error diffusion procedure executed by the second EDF module 58, which uses Floyd's kernel to hide a grayscale watermark, can be expressed as follows:

```
for each i                      /* loop through each row */
    for each j                  /* loop through each column */
        noise_value = N_A       /* setting noise value */
        N_diff = max_level - min_level
        /* determining offset values */
        if [EDF1_{i,j} = min_level], then
        {
            offset_value = noise_value * (1 - W_{i,j}/N_diff)
        }
        if[EDF1_{i,j} = max_level], then
        {
            offset_value = noise_value * (W_{i,j}/N_diff)
        }
        /* performing halftoning for current pixel of EDF2 */
        oldpixel = pixel(i, j) + offset_value
        if oldpixel ≥ threshold, then newpixel = max_level
        if oldpixel < threshold, then newpixel = min_level
        pixel(i, j) = newpixel
        /* performing error diffusion for EDF2 */
        error_value = oldpixel - newpixel - offset_value
        pixel(i+1, j) = pixel(i+1, j) + 7/16 * error_value
        pixel(i-1, j+1) = pixel(i-1, j+1) + 3/16 * error_value
        pixel(i, j+1) = pixel(i, j+1) + 5/16 * error_value
        pixel(i+1, j+1) = pixel(i+1, j+1) + 1/16 * error_value
    endfor (j)
endfor (i)
```

Referring to FIG. 2, as described previously, after the second EDF module 58 transforms the original image I and the grayscale watermark W into the second halftone image EDF2, the superimposing module 60 superimposes the first halftone image EDF1 with the second halftone image EDF2 to generate the superimposed halftone image S. The Gaussian filter 62 performs the Gaussian filter procedure to convert the superimposed halftone image S to a first filtered image $S_g$ and convert the first halftone image EDF1 to a second filtered image $EDF1_g$. The Gaussian filter procedure performed by the Gaussian filter 62 can be expressed as follows:

$$g_{x,y} = \dfrac{1}{2\pi\sigma_x\sigma_y\sqrt{1-\rho^2}} \times e^{-\frac{1}{2(1-\rho^2)}\left[\frac{(x-\mu_x)^2}{\sigma_x^2} - 2\rho\left(\frac{x-\mu_x}{\sigma_x}\right)\left(\frac{y-\mu_y}{\sigma_y}\right) + \frac{y-\mu_y^2}{\sigma_y^2}\right]}, \quad (24)$$

where $g_{x,y}$ is the new pixel value of the filtered image at coordinate (x, y) after performing the Gaussian filter procedure, $\mu_x$ is an average of x, $\mu_y$ is an average of y, $\sigma_x$ and $\sigma_y$ are standard deviations, and $\rho$ indicates the correlation coefficient. A way for looking for the optimized $\sigma_x$ and $\sigma_y$ will be discussed later. Moreover, in other embodiments of the present invention, the Gaussian filter 62 is replaced by other filters, e.g. a low-pass filter, a diffusion filter, etc. The present invention is not limited thereto.

Subsequently, the subtractor 64 subtracts the pixel values of the second filtered image $EDF1_g$ from the pixels values of the first filtered image $S_g$ and output the results to the decoding module 66 such that the decoding module 66 generates a restoration image D according to the results received from the subtractor 64. The pixel value $H_{i,j}$ of a pixel of the restoration image D at coordinate (i,j) is equal to a sum of a restoration value $H'_{i,j}$ of the restoration image D at coordinate (i,j) and the absolute value of a minimum value $H'_{min}$, where the restoration value $H'_{i,j}$ is equal to a result of subtracting a pixel value $(EDF1_g)_{i,j}$ of the second filtered image $EDF1_g$ at coordinate (i,j) from a pixel value $(S_g)_{i,j}$ of the first filtered image $S_g$ at coordinate (i,j), and the minimum value $H'_{min}$ is the minimum of all restoration values of the restoration image D. Briefly, the relationships of the values $H_{i,j}$, $H'_{i,j}$, $H'_{min}$, $(EDF1_g)_{i,j}$ and $S_g(i,j)$ can be formulated as follows:

$$H'_{i,j} = (S_g)_{i,j} - (EDF1_g)_{i,j} \tag{25}$$

$$H'_{min} = \text{minimum}(H'_{i,j}) \tag{26}$$

$$H_{i,j} = H'_{i,j} + |H'_{min}| \tag{27}$$

Moreover, because the restoration image D may have a low contrast, a histogram equalization procedure may be executed to enhance the contrast of the restoration image D. The histogram equalization procedure is expressed as follows:

$$D_{i,j} = T(H_{i,j}) = N_{\text{diff}} \times \sum_{i=0}^{H_{i,j}} p(g_i), \tag{28}$$

where $T(H_{i,j})$ is a transfer function of $H_{i,j}$, $g_i$ indicates the grayscale value (e.g. 0 to 255), and $P(g_i)$ is a probability density function of $g_i$ in the image D.

Figure 11:
FIG. 11 is an image of an exemplary grayscale watermark to be hidden.
Figure 12:
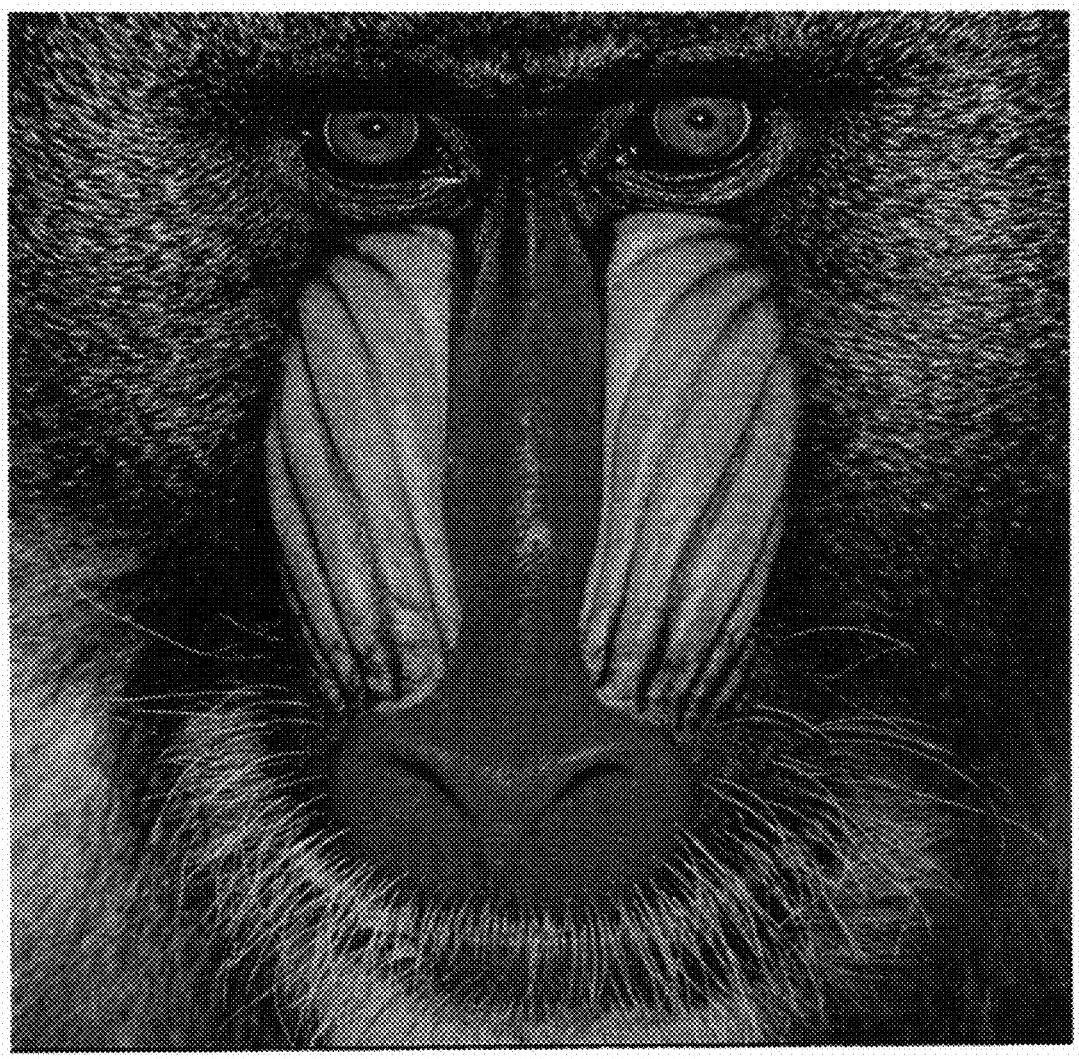
FIG. 12 is an exemplary first halftone image produced by the first EDF module shown in FIG. 2 according to another embodiment of the present invention.
Figure 13:
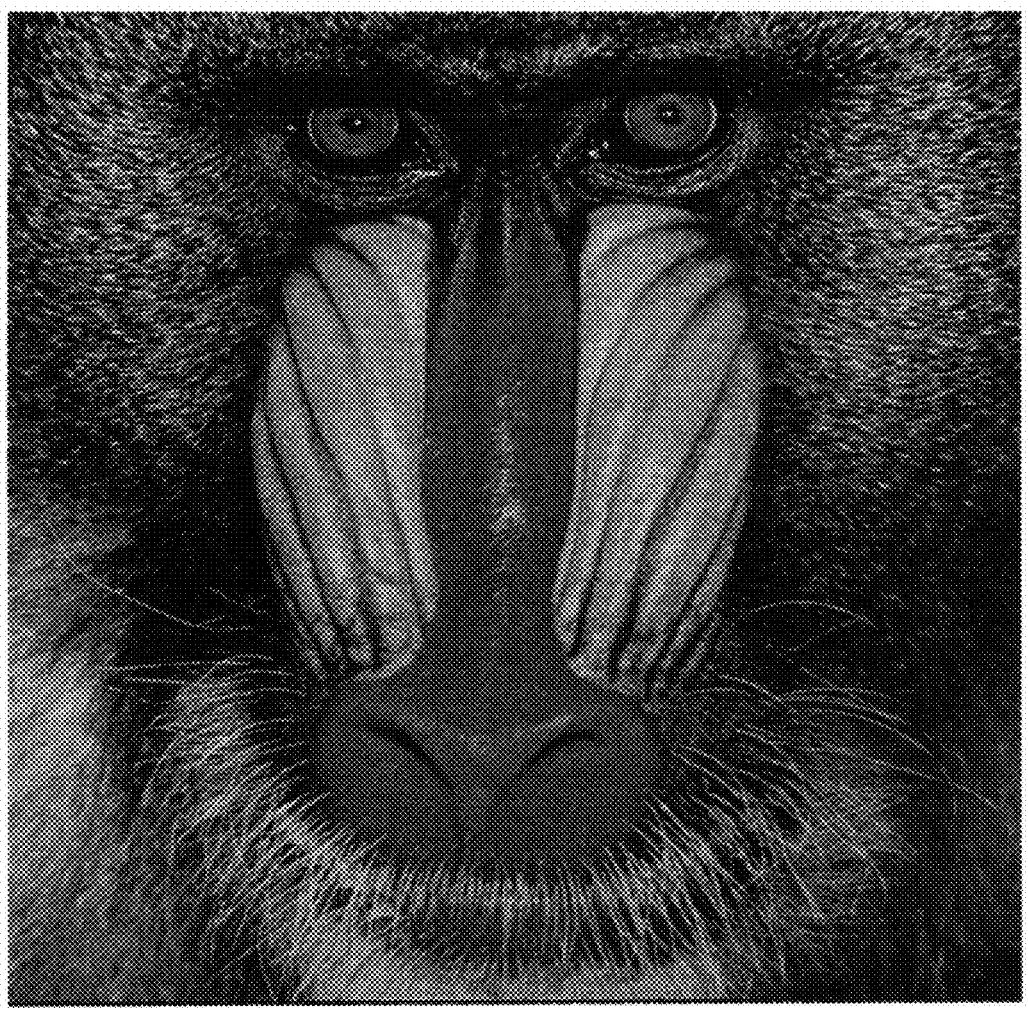
FIG. 13 is an exemplary second halftone image, which is produced by the second EDF module shown in FIG. 2 and contains hidden information of the grayscale watermark shown in FIG. 11.
Figure 14:
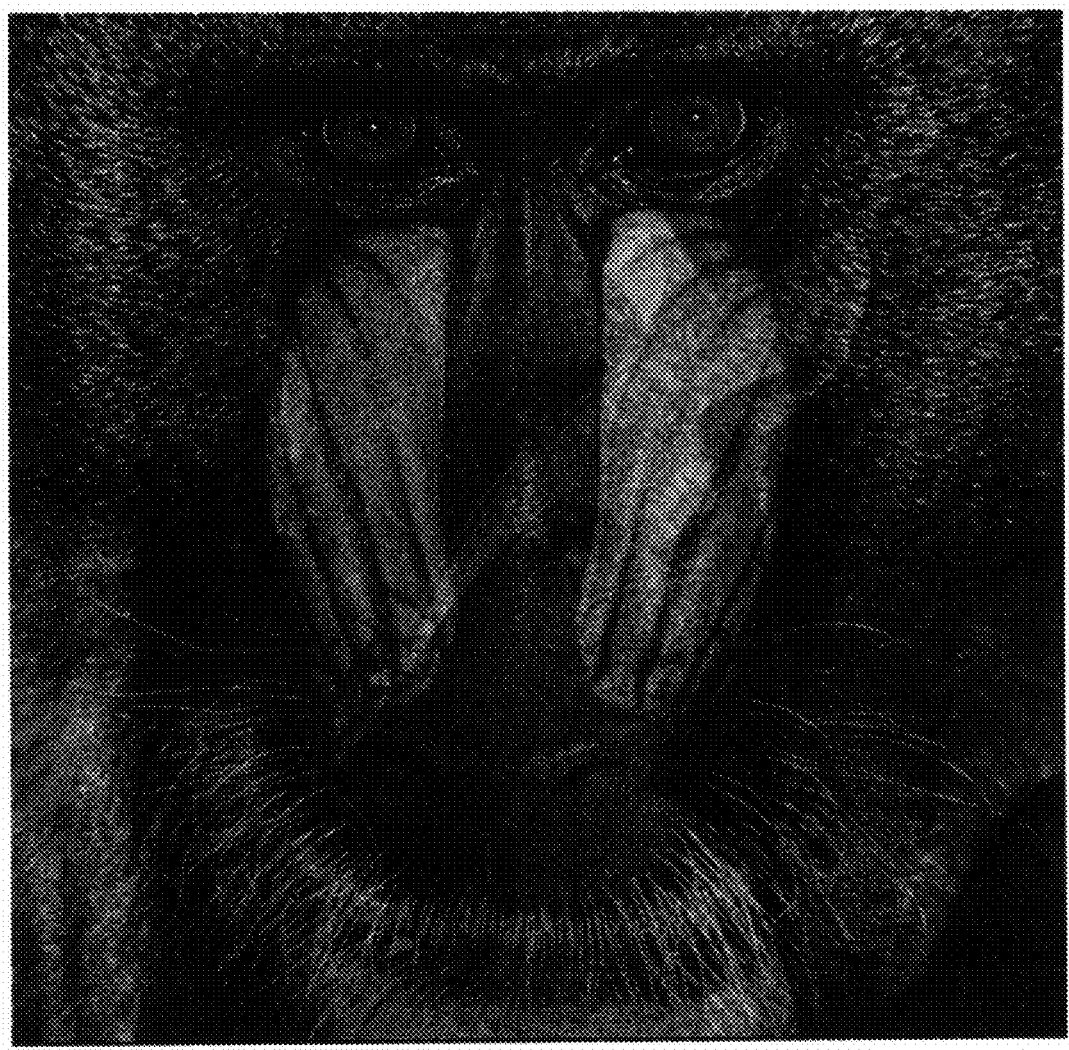
FIG. 14 is a superimposed halftone image produced by superimposing the first halftone image shown in FIG. 12 with the second halftone image shown in FIG. 13 via the superimposing module shown in FIG. 2.
Figure 15:
FIG. 15 is a restoration image generated by decoding the superimposed halftone image shown in FIG. 14 via the decoding module in FIG. 2.

Please refer to FIGS. 11 to 15. FIG. 11 is an image of an exemplary grayscale watermark to be hidden. FIG. 12 is an exemplary first halftone image produced by the first EDF module 56 in FIG. 2. FIG. 13 is an exemplary second halftone image, which is produced by the second EDF module 58 in FIG. 2 and contains hidden information of the grayscale watermark shown in FIG. 11. FIG. 14 is a superimposed halftone image produced by superimposing the first halftone image shown in FIG. 12 with the second halftone image shown in FIG. 13 via the superimposing module 60 in FIG. 2. FIG. 15 is a restoration image generated by decoding the superimposed halftone image according to the equations (25)-(27) via the decoding module 66. It can be seen that the restoration image shown in FIG. 15 resembles the watermark shown in FIG. 11.

In another embodiment of the present invention, if the watermark W is a halftone image, the embedded watermark could be seen by using two transparent mediums, e.g. transparent plastics films. Firstly, the first halftone image EDF1 is printed on a first transparent medium, and the second halftone image EDF2 is printed on a second transparent medium. Then, the embedded watermark could be seen by overlapping the first transparent medium having the first halftone image EDF1 printed thereon with the second transparent medium having the second halftone image EDF2 printed thereon.

Figure 16:
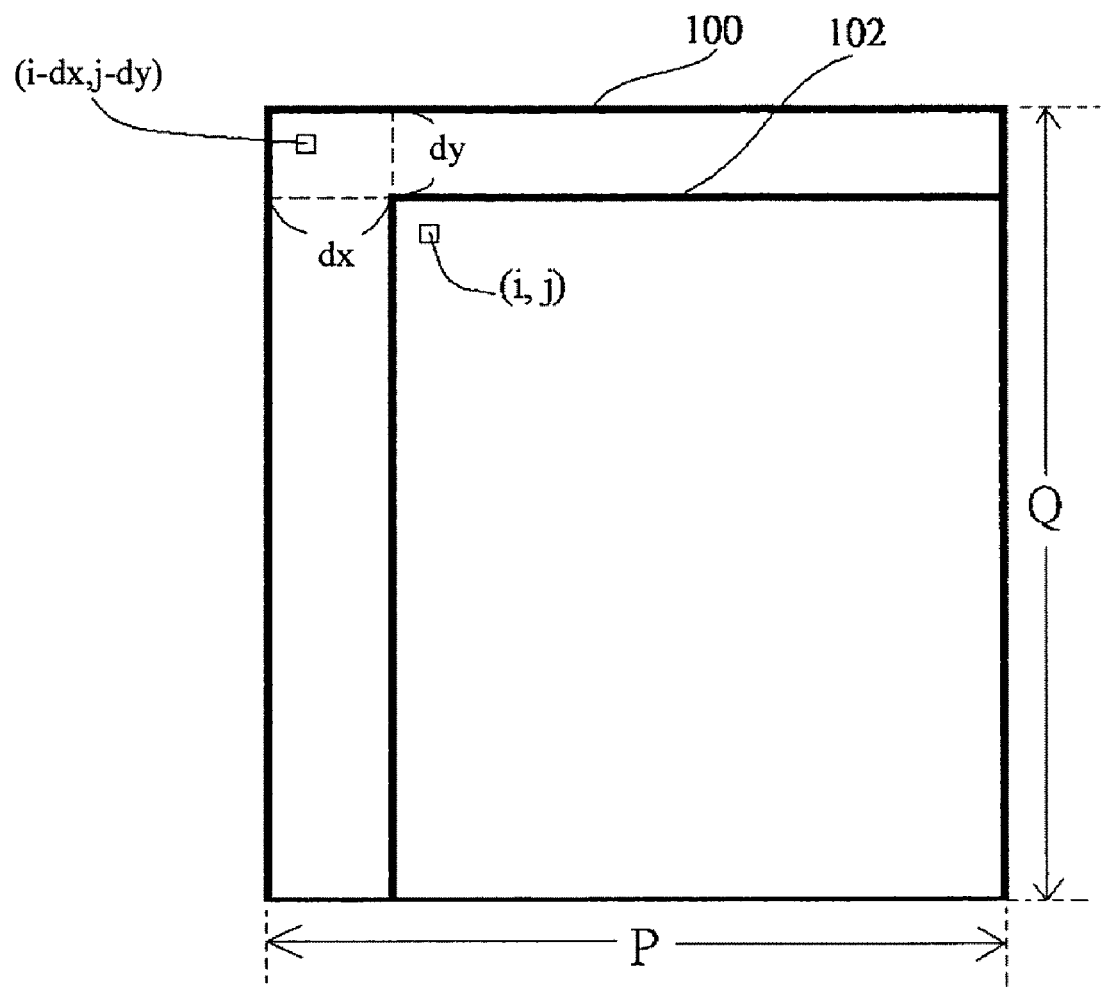
FIG. 16 is a schematic diagram of a halftone image used for explaining how to hide a watermark into a single halftone image.

Additionally, the method of halftone watermarking of the present invention can be extended to hide a watermark into a single halftone image and to extract a restoration image, which resembles the watermark, from the single halftone image. Referring to FIG. 16, which is a schematic diagram of a halftone image 100. The halftone image 100 is converted from an original image I via the first EDF module 56 and the second EDF module 58 in FIG. 2. The original image I and the halftone image 100 have an identical dimension that consists of P rows and Q columns of pixels, where P and Q are positive integers. The halftone image 100 includes a rectangular display area 102, which is used to hide a watermark W. The bottom side and right side of the display area 102 respectively overlap with the bottom side and right side of the halftone image 100. Further, as shown in FIG. 16, a horizontal value dx indicates the number of pixels of an interval between the left side of the halftone image 100 and the left side of the display area 102, and a vertical value dy indicates the number of pixels of an interval between the upper side of the halftone image 100 and the upper side of the display area 102. In the embodiment, both the horizontal value dx and the vertical value dy are positive integers. However, the horizontal value dx may be equal to zero while the vertical value dy is positive, or the vertical value dy may be equal to zero while horizontal value dx is positive. The pixel value of each pixel in the display area 102 is calculated by the second EDF module 58. Except the pixels in the display area 102, all of the other pixels of the halftone image 100 are generated by the first EDF module 56 and are defined as a set EDF1, for simplicity's sake. Correspondingly, all pixels in the display area 102 are defined as a set EDF2. If all of the pixels of the halftone image 100 are defined as a set EDF, EDF=EDF1∪EDF2. Each of the pixel values of the pixels of EDF1 is calculated according to the equations (1)-(4). In other words, the pixel value $EDF1_{i,j}$ of EDF1 at coordinate (i,j) is determined according to the pixel value of the original image I at coordinate (i,j) and the error values diffused from neighboring pixels. Relatively, the pixel value $EDF2_{i,j}$ of the pixel of EDF1 at coordinate (i,j) is determined according to the pixel value $W_{i,j}$ of the watermark W, the pixel value of the pixel of the original image I at coordinate (i,j), the error values diffused from neighboring pixels, and a corresponding offset value $O_{i,j}$. For each pixel in the display area 102 at coordinate (i,j), the a parameter i of the coordinate (i,j) is greater than the horizontal value dx, and the parameter j of the coordinate (i,j) is greater than the vertical value dy. In the embodiment, the watermark W is a grayscale image, and the offset value $O_{i,j}$ at coordinate (i,j) is determined according to the following equation:

$$O_{i,j} = \begin{cases} N_A \times \left(1 - \dfrac{W_{i-dx, j-dy}}{N_{\text{diff}}}\right), & \text{if } EDF_{i-dx, j-dy} \in (EDF)_B \\ N_A \times \left(\dfrac{W_{i-dx, j-dy}}{N_{\text{diff}}}\right), & \text{if } EDF_{i-dx, j-dy} \in (EDF)_W, \end{cases} \tag{28}$$

where $W_{i-dx, j-dy}$ is the pixel value of the watermark W at coordinate (i−dx, j−dy), EDF(i−dx, j−dy) is the pixel value of the halftone image 100 at coordinate (i−dx, j−dy), $(EDF)_B$ is defined a set of all of the black pixels of the halftone image 100, and $(EDF)_W$ is defined a set of all of the white pixels of the halftone image 100.

Referring to FIG. 16 again, when the coordinate (i,j) is located within the display area 102, the offset value $O_{i,j}$ at coordinate (i,j) is associated with the pixel value EDF(i−dx, j−dy) of the halftone image 100. Since the horizontal value dx and the vertical value dy are fixed, the coordinate (i−dx, j−dy) may be located within the display area 102 while i>2dx and j>2dy. The way to determine the pixel values of the pixels in the display area 100 is similar to the way to perform the second error diffusion procedure according to the equations (8)-(11), (13), (17)-(18) and (21)-(23). However, in the embodiment, the equations (21)-(23) are slightly modified. The equation (21) is altered as the equation (28), and the equations (22)-(23) are modified as the follows:

$$v_{i,j} = x_{i,j}^{sum} + O_{i,j} \quad (29)$$

$$= \begin{cases} x_{i,j}^{sum} + N_A \times \left(1 - \dfrac{W_{i-dx,j-dy}}{N_{diff}}\right), & \text{if } EDF_{i-dx,j-dy} \in (EDF)_B \\ x_{i,j}^{sum} + N_A \times \left(\dfrac{W_{i-dx,j-dy}}{N_{diff}}\right), & \text{if } EDF_{i-dx,j-dy} \in (EDF)_W \end{cases}$$

$$e_{i,j} = e_{i,j}^o - O_{i,j} \quad (30)$$

$$= \begin{cases} e_{i,j}^o - N_A \times \left(1 - \dfrac{W_{i-dx,j-dy}}{N_{diff}}\right), & \text{if } EDF_{i-dx,j-dy} \in (EDF)_B \\ e_{i,j}^o - N_A \times \left(\dfrac{W_{i-dx,j-dy}}{N_{diff}}\right), & \text{if } EDF_{i-dx,j-dy} \in (EDF)_W \end{cases}$$

In an embodiment of the present invention, the pseudo-code using Floyd's kernel to perform an error diffusion procedure to hide a grayscale watermark into a signal halftone image can be expressed as follows:

```
/* performing the error diffusion procedure for EDF1*/
for each (i, j) ∈ EDF1
        /* performing halftoning for current pixel of EDF1 */
        oldpixel = pixel(i, j)
        if oldpixel ≧ threshold, then newpixel = max_level
        if oldpixel < threshold, then newpixel = min_level
        pixel(i, j) = newpixel
        /* performing error diffusion for EDF1 */
        error_value = oldpixel − newpixel
        pixel(i+1, j) = pixel(i+1, j) + 7/16 * error_value
        pixel(i−1, j+1) = pixel(i−1, j+1) + 3/16 * error_value
        pixel(i, j+1) = pixel(i, j+1) + 5/16 * error_value
        pixel(i+1, j+1) = pixel(i+1, j+1) + 1/16 * error_value
endfor (i, j)
/* performing the error diffusion procedure for EDF2*/
for each i > dx            /* row loop begins at (dx+1)th pixel*/
    for each j > dy        /* column loop begins at (dy+1)th pixel*/
        noise_value = N_A  /* setting noise value */
        N_diff = max_level − min_level
        /* determining offset values */
        if [ EDF_{i−dx,j−dy} = min_level], then
        {
            offset_value = noise_value * (1 − W_{i−dx,j−dy}/N_diff)
        }
        if [ EDF_{i−dx,j−dy} = max_level], then
        {
            offset_value = noise_value * (W_{i−dx,j−dy}/N_diff)
        }
        /* performing halftoning for current pixel of EDF2 */
        oldpixel = pixel(i, j) + offset_value
        if oldpixel ≧ threshold, then newpixel = max_level
        if oldpixel < threshold, then newpixel = min_level
        pixel(i, j) = newpixel
        /* performing error diffusion for EDF2 */
        error_value = oldpixel − newpixel − offset_value
        pixel(i+1, j) = pixel(i+1, j) + 7/16 * error_value
        pixel(i−1, j+1) = pixel(i−1, j+1) + 3/16 * error_value
        pixel(i, j+1) = pixel(i, j+1) + 5/16 * error_value
        pixel(i+1, j+1) = pixel(i+1, j+1) + 1/16 * error_value
    endfor (j)
endfor (i)
```

Figure 17:
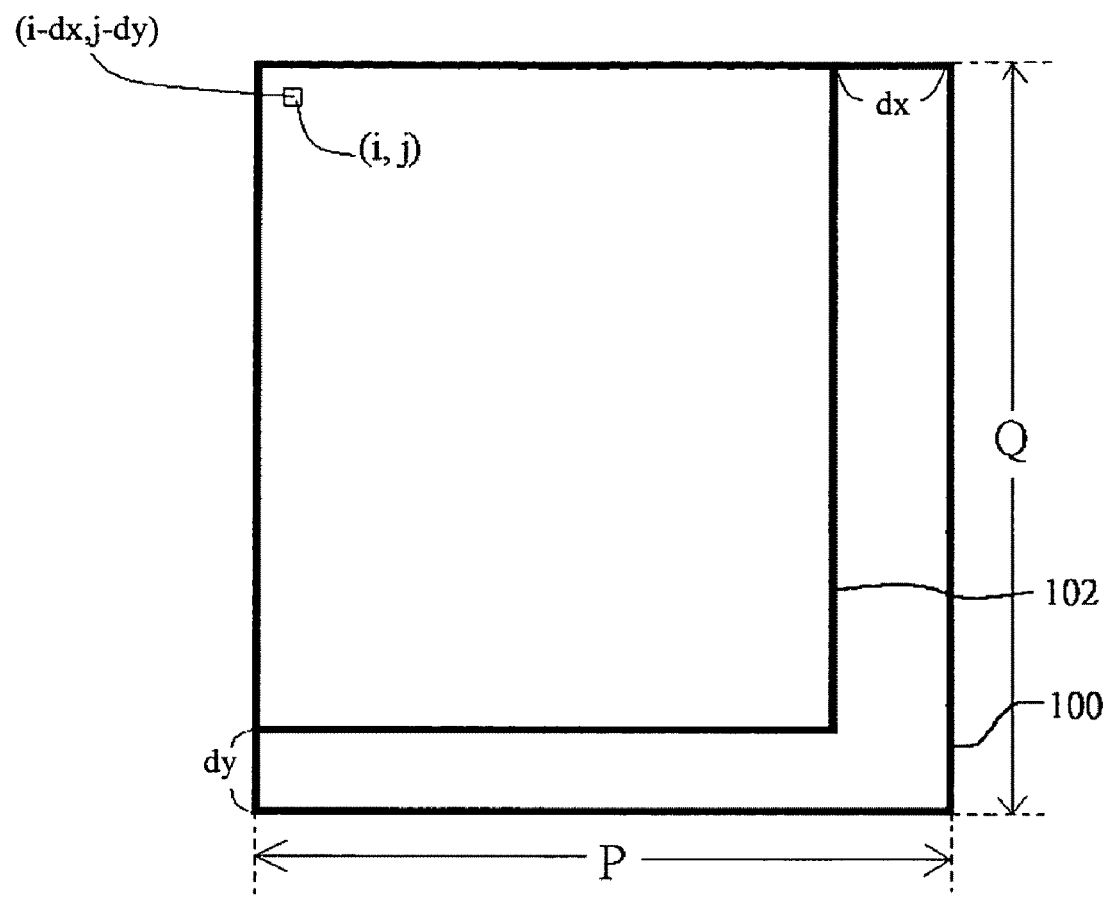
FIG. 17 is a schematic diagram showing how to convert single halftone image to a superimposed image via the superimposing module shown in FIG. 2.

Through the equations (8)-(11), (13), (17)-(18) and (28)-(30), the first EDF module 56 and the second EDF module 58 of the encoder 52 in FIG. 2 can hide the watermark W in the display area 102 of the halftone image 100. Please refer to FIG. 17, which is a schematic diagram showing how to generate a superimposed image S via the superimposing module 60 shown in FIG. 2. When generating the superimposed image S, the display area 102 seems shifted upward by the horizontal value dx and shifted left by the vertical value dy such that the pixel of the display area 102 at coordinate (i,j) is corresponded to the pixel of the halftone image 100 at (i−dx, j−dy). More detailedly, during generating the superimposed image S, a plurality of pixels of the halftone image at coordinates $$\sum_{x=dx+1}^{P} \sum_{y=dy+1}^{Q} (x, y)$$

are selected as a process image, i.e. the display area 102 shown in FIG. 17. Then, the superimposing module 60 superimposes the process image 102 with the halftone image 100 to generate the superimposed halftone image S. Therefore, the pixel value $S_{i,j}$ of a pixel of the superimposed halftone image S at coordinate (i,j) can be determined according to the following equation:

$$S_{i,j} = \min[EDF_{i,j}, EDF_{i-dx,j-dy}] \quad (31)$$

where, because all of the pixels of the halftone image 100 have been defined as the set EDF, $EDF_{i,j}$ is the pixel value of the halftone image 100 at coordinate (i,j), and $EDF_{i-dx,j-dy}$ is the pixel value of the halftone image 100 at coordinate (i−dx, j−dy). The pixel value $S_{i,j}$ of a pixel of the superimposed halftone image S at coordinate (i,j) is the minimum of the two pixel values $EDF_{i,j}$ and $EDF_{i-dx,j-dy}$.

Being similar with one embodiment described previously, in the embodiment, after the superimposed image S is generated, the Gaussian filter 62 performs the Gaussian filter procedure to convert the superimposed halftone image S to a first filtered image $S_g$ and convert the halftone image EDF to a first filtered image $EDF1_g$. Then, the subtractor 64 subtracts the pixel values of the second filtered image $EDF1_g$ from the pixels values of the first filtered image $S_g$ and output the results to the decoding module 66 such that the decoding module 66 generates a restoration image D according to the results received from the subtractor 64. According to the equations (25)-(27), the pixel value $H_{s,t}$ of a pixel of the restoration image D at coordinate (s,t) is equal to a sum of a restoration value $H'_{s,t}$ of the restoration image D at coordinate (s,t) and the absolute value of a minimum value $H'_{min}$, where the restoration value H'(s,t) is equal to a result of subtracting a pixel value $(EDF1_g)_{s,t}$ of the second filtered image $EDF1_g$ at coordinate (s,t) from a pixel value $(S_g)_{s,t}$ of the first filtered image $S_g$ at coordinate (s,t), and the minimum value $H'_{min}$ is the minimum of all restoration values of the restoration image D.

Figure 18:
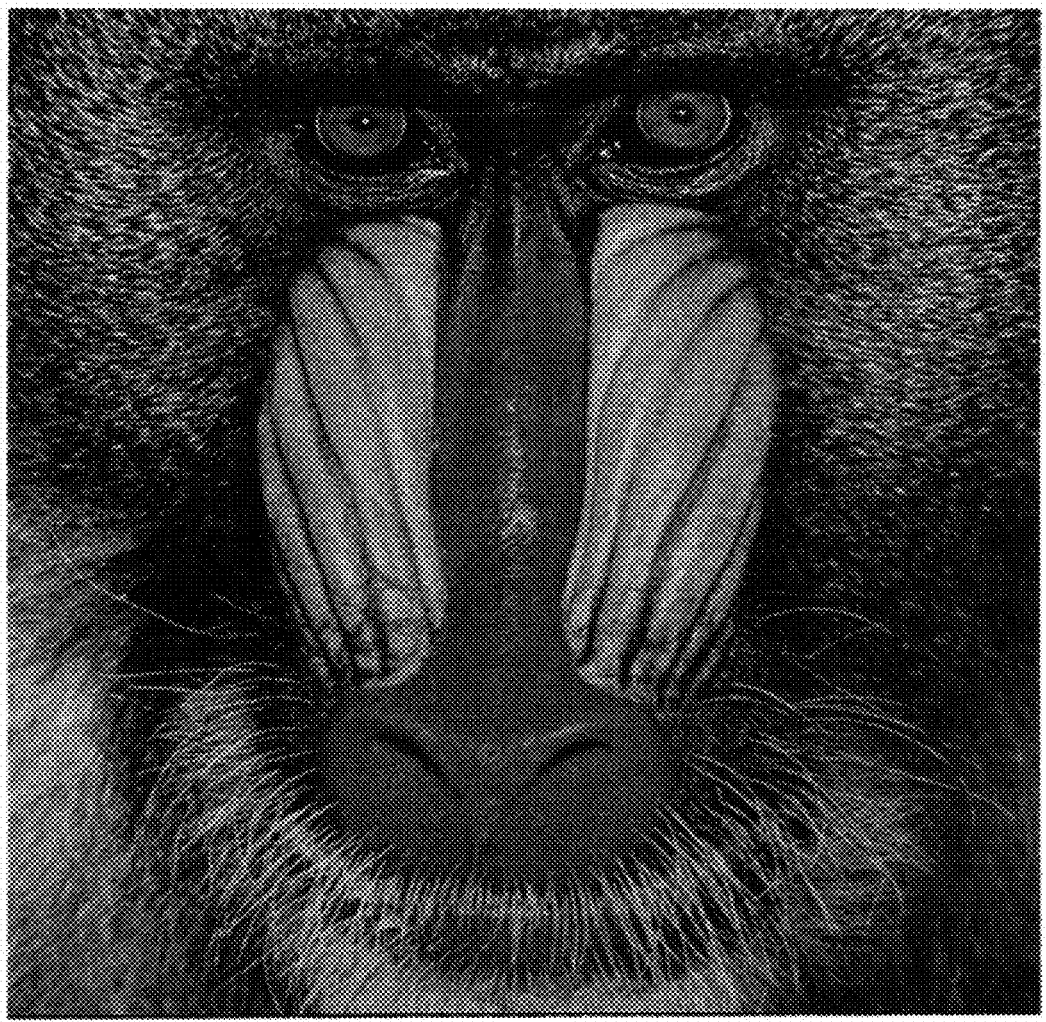
FIG. 18 is an exemplary halftone image generated according to another embodiment of the present invention.
Figure 19:
FIG. 19 is a restoration image generated by superimposing and decoding the halftone image in FIG. 18.

Please refer to FIGS. 11 and 18-19. FIG. 11 is the image of a grayscale watermark used previously. FIG. 18 is an exemplary halftone image generated according to the equations (8)-(11), (13), (17)-(18) and (28)-(30) to hide information of the watermark in FIG. 11. FIG. 19 is a restoration image generated by superimposing and decoding the halftone image in FIG. 18. It can be seen that the restoration image shown in FIG. 19 resembles the watermark shown in FIG. 11.

Besides hiding a grayscale image into a single halftone image, the present invention also can be extended to hide a halftone watermark into a single halftone image and to extract the watermark D. To achieve this purpose, the equations (28)-(30) are modified as follows:

$$O_{i,j} = \begin{cases} N_A, & \text{if } W(i,j) = EDF(i-d_x, j-d_y) \\ -N_A, & \text{if } W(i,j) \neq EDF(i-d_x, j-d_y) \end{cases} \quad (32)$$

$$v_{i,j} = x_{i,j}^{sum} + O_{i,j} \quad (33)$$
$$= \begin{cases} x_{i,j}^{sum} + N_A, & \text{if } W(i,j) \neq EDF(i-d_x, j-d_y) \\ x_{i,j}^{sum} - N_A, & \text{if } W(i,j) \neq EDF(i-d_x, j-d_y) \end{cases}$$

$$e_{i,j} = e_{i,j}^o - O_{i,j} \quad (34)$$
$$= \begin{cases} e_{i,j}^o - N_A, & \text{if } W(i,j) \neq EDF(i-d_x, j-d_y) \\ e_{i,j}^o + N_A, & \text{if } W(i,j) \neq EDF(i-d_x, j-d_y) \end{cases}$$

In an embodiment of the present invention, the pseudo-code using Floyd's kernel to perform an error diffusion procedure to hide a halftone watermark into a signal halftone image can be expressed as follows:

```
/* performing the error diffusion procedure for EDF1*/
for each (i, j) ∈ EDF1
        /* performing halftoning for current pixel of EDF1 */
        oldpixel = pixel(i, j)
        if oldpixel ≧ threshold, then newpixel = max_level
        if oldpixel < threshold, then newpixel = min_level
        pixel(i, j) = newpixel
        /* performing error diffusion for EDF1 */
        error_value = oldpixel – newpixel
        pixel(i+1, j) = pixel(i+1, j) + 7/16 * error_value
        pixel(i–1, j+1) = pixel(i–1, j+1) + 3/16 * error_value
        pixel(i, j+1) = pixel(i, j+1) + 5/16 * error_value
        pixel(i+1, j+1) = pixel(i+1, j+1) + 1/16 * error_value
endfor (i, j)
/* performing the error diffusion procedure for EDF2*/
for each i > dx                /* row loop begins at (dx+1)th pixel*/
        for each j > dy        /* column loop begins at (dy+1)th pixel*/
                noise_value = N_A    /* setting noise value */
                N_diff = max_level – min_level
                /* determining offset values */
                if W_{i,j} = EDF_{i–dx,j–dy}, then
                        offset_value = positive(noise_value)
                if W_{i,j} ≠ EDF_{i–dx,j–dy}, then
                        offset_value = negative(noise_value)
                /* performing halftoning for current pixel of EDF2 */
                oldpixel = pixel(i, j) + offset_value
                if oldpixel ≧ threshold, then newpixel = max_level
                if oldpixel < threshold, then newpixel = min_level
                pixel(i, j) = newpixel
                /* performing error diffusion for EDF2 */
                error_value = oldpixel – newpixel – offset_value
                pixel(i+1, j) = pixel(i+1, j) + 7/16 * error_value
                pixel(i–1, j+1) = pixel(i–1, j+1) + 3/16 * error_value
                pixel(i, j+1) = pixel(i, j+1) + 5/16 * error_value
                pixel(i+1, j+1) = pixel(i+1, j+1) + 1/16 * error_value
        endfor (j)
endfor (i)
```

In another embodiment of the present invention, if the watermark W is a halftone image, the embedded watermark could be seen by using two transparent mediums. Firstly, the halftone image 100 is printed on a first transparent medium and a second transparent medium. Then, by overlapping the first transparent medium having the halftone image 100 printed thereon with the second transparent medium having the halftone image EDF2 printed thereon, the embedded watermark could be seen when the coordinate (i,j) of the halftone image printed on the first transparent medium is aligned with the coordinate (i–dx, j–dy) of the halftone image printed on the second transparent medium.

In order estimate the benefits of the present invention, two quantification values are defined herein. The first quantification value is correct decode rate (CDR), and the other quantification value is peak signal-to-noise ratio (PSNR). The two quantification values are defined as follows:

$$CDR = \left(1 - \frac{\sum_{i=1}^{P}\sum_{j=1}^{Q}|(D_g)_{i,j} - (W_g)_{i,j}|}{P \times Q \times 255}\right) \times 100\% \quad (35)$$

$$PSNR = \quad (36)$$
$$10\log_{10}\frac{P \times Q \times 255^2}{\sum_{i=1}^{P}\sum_{j=1}^{Q}\left[(W)_{i,j} - \sum_{m,n \in R}\sum w_{m,n}(D)_{i+m,j+n}\right]^2},$$

where $(D_g)_{i,j}$ is the pixel value of a filtered restoration image $D_g$ at (i,j), $(W_g)_{i,j}$ is the pixel value of a filtered watermark $W_g$ at (i,j), P is the number of rows of the pixels of the original image I, Q is a numbers of columns of the pixels of the original image I, and $w_{m,n}$ is the coefficient of a Least-Mean-Squares (LMS) filter at coordinate (m,n) of the LMS filter. The Gaussian filter 62 performs the Gaussian filter procedure to convert the restoration image D to the filtered restoration image $D_g$ and to convert the watermark W to the filtered watermark $W_g$. The filtered restoration image $D_g$ and the filtered watermark $W_g$ are transmitted to the CDR module 68 to calculate the corresponding CDR and PSNR according to the equations (35) and (36).

Figure 20:
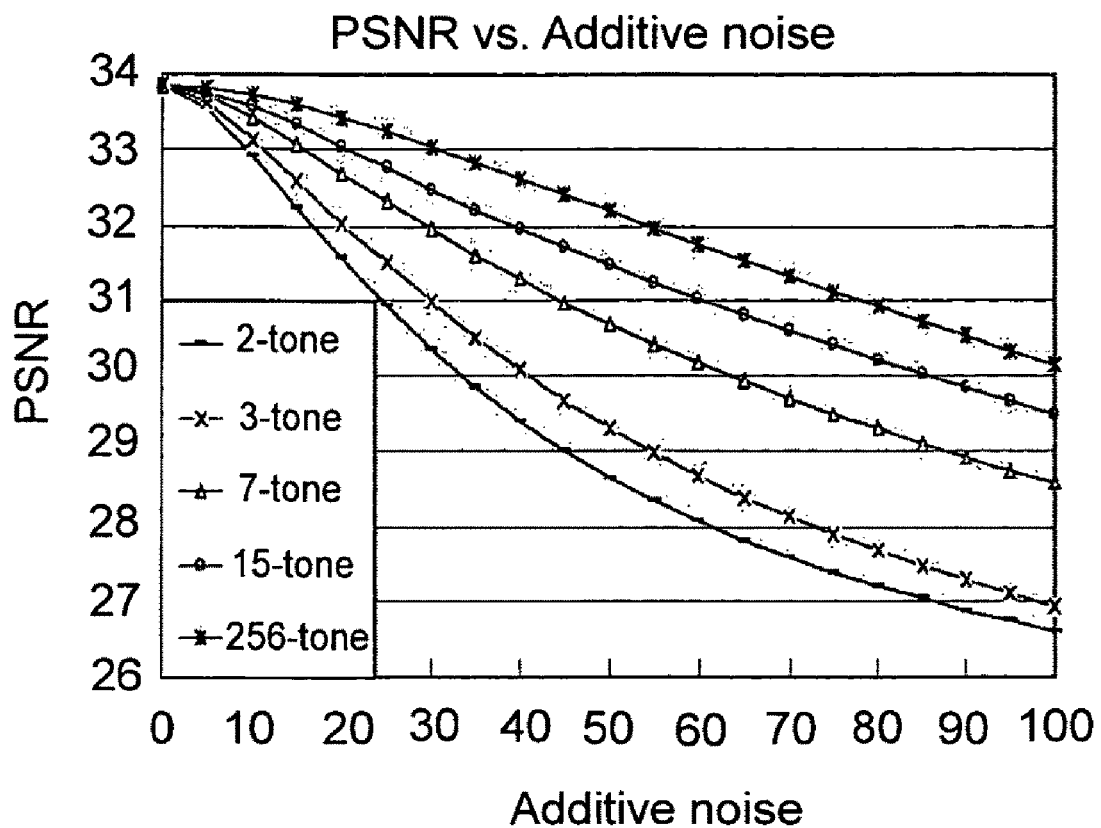
FIG. 20 is an experimental chart showing the relationships between different additive noise values and corresponding PSNR.
Figure 21:
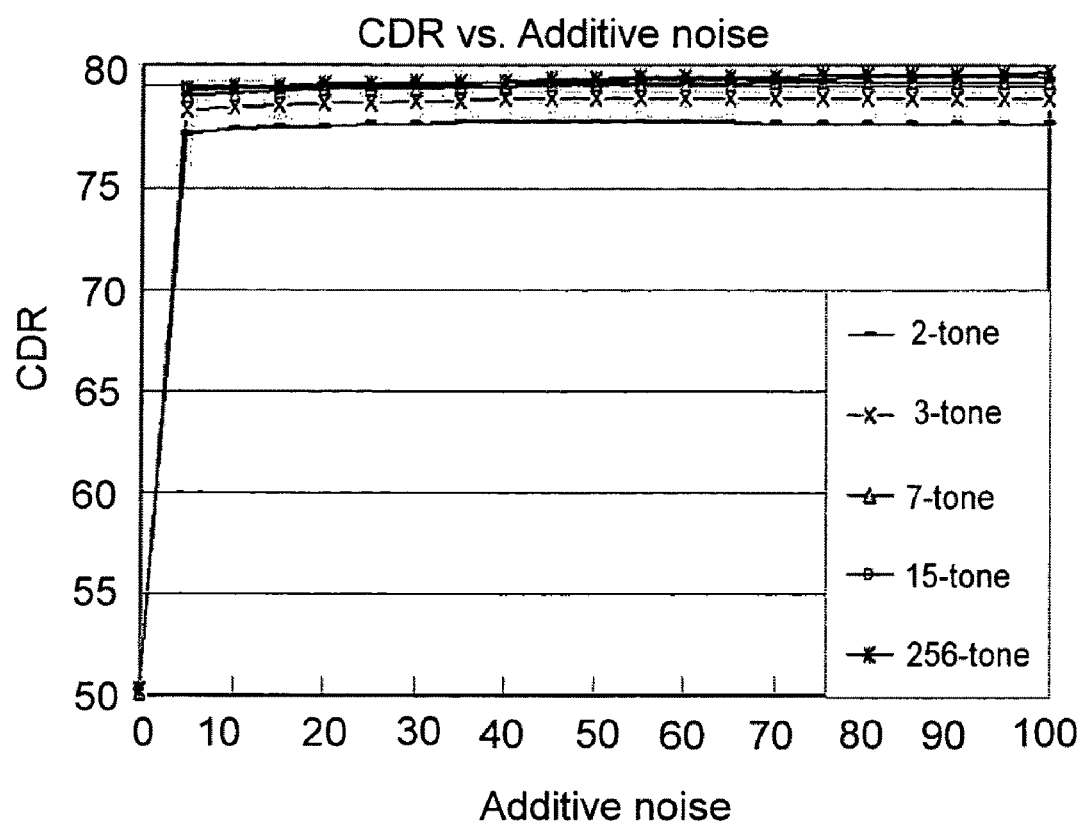
FIG. 21 is an experimental chart showing the relationships between different additive noise values and the corresponding CDR.

Please refer to FIGS. 20 and 21. FIG. 20 is an experimental chart showing the relationships between different additive noise values $N_A$ and corresponding PSNR. Five curves show in FIG. 20, and each of the curves indicates a corresponding number of gray levels of the watermark W. For example, the curve with marks "*" represent the relationship between $N_A$ and PSNR while the watermark W is a 256-tone image, and curve with marks "–" represent the relationship between $N_A$ and PSNR while the watermark W is a 2-tone image. FIG. 21 is an experimental chart showing the relationships between different additive noise values $N_A$ and the corresponding CDR. Similarly, five curves show in FIG. 21, and each of the curves indicates a corresponding gray levels of the watermark W. Based on the two experimental charts in FIGS. 20 and 21, the noise values $N_A$ is set around 25 to obtain a balance between the CDR and the PSNR.

Figure 22:
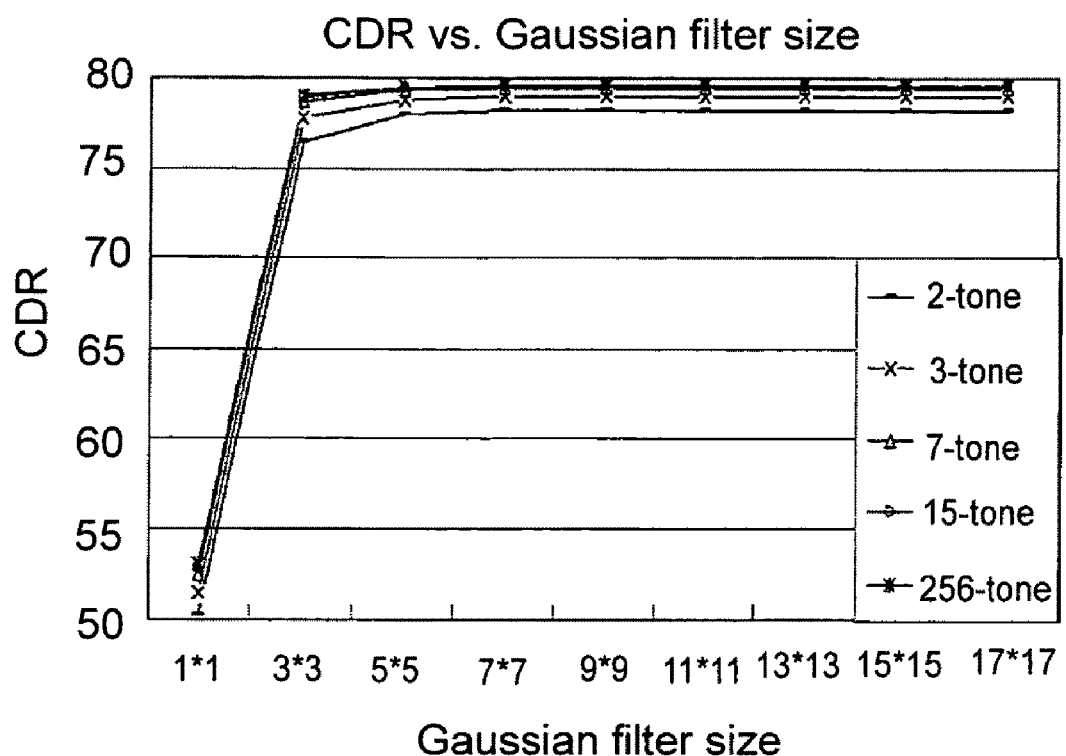
FIG. 22 is an experimental chart showing the relationships between the filter size of the Gaussian filter in FIG. 2 and the corresponding CDR.

Please refer to FIG. 22, which is an experimental chart showing the relationships between the filter size of the Gaussian filter 62 and the corresponding CDR. Similarly, each of five curves show in FIG. 22 indicates a corresponding gray levels of the watermark W. Because larger filter size results in greater CDR and less efficiency, a filter size of 7×7 is selected to obtain a balance between the CDR and the efficiency.

Figure 23:
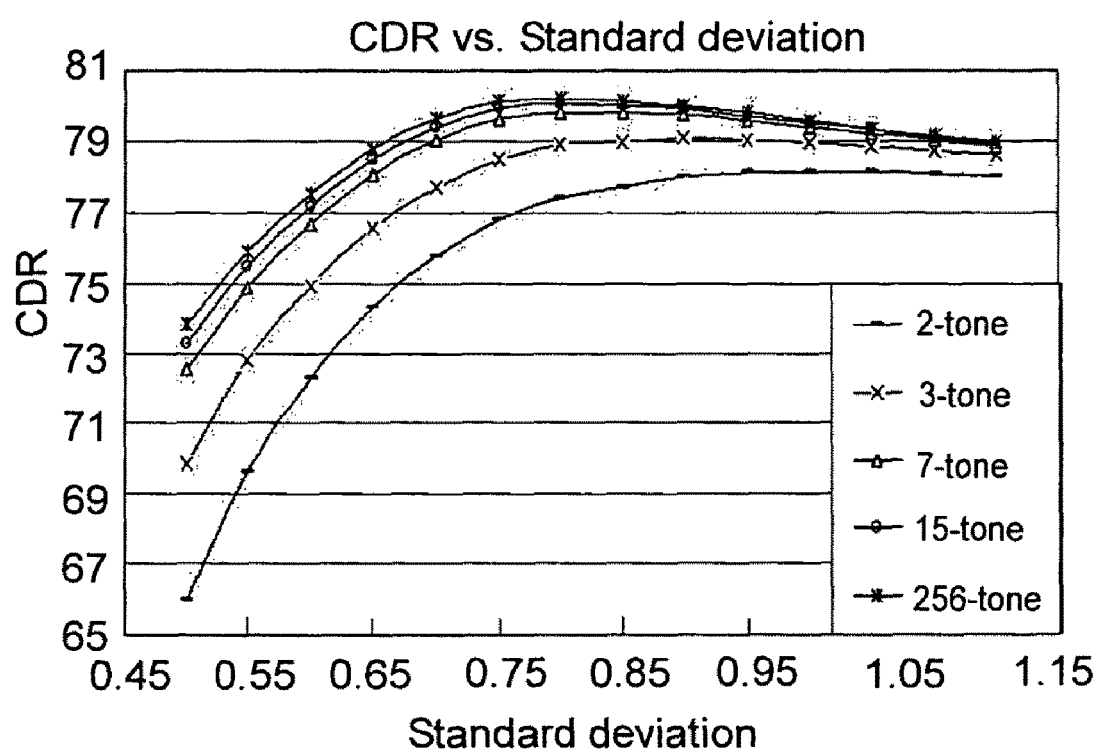
FIG. 23 is an experimental chart showing the relationships between the standard deviation of the Gaussian filter and the corresponding CDR.

Please refer to FIG. 23, which is an experimental chart showing the relationships between the standard deviations $\sigma_x$ and $\sigma_y$ used in the equation (24) and the corresponding CDR. Because the standard deviations $\sigma_x$ and $\sigma_y$ are identical, each value indicated on the horizontal axis of the chart in FIG. 23 can represent both the standard deviations $\sigma_x$ and $\sigma_y$. Similarly, each of five curves show in FIG. 23 indicates a corresponding gray levels of the watermark W. Based on the experimental chart in FIG. 23, the standard deviations $\sigma_x$ and $\sigma_y$ are set around 0.9.

Figure 24:
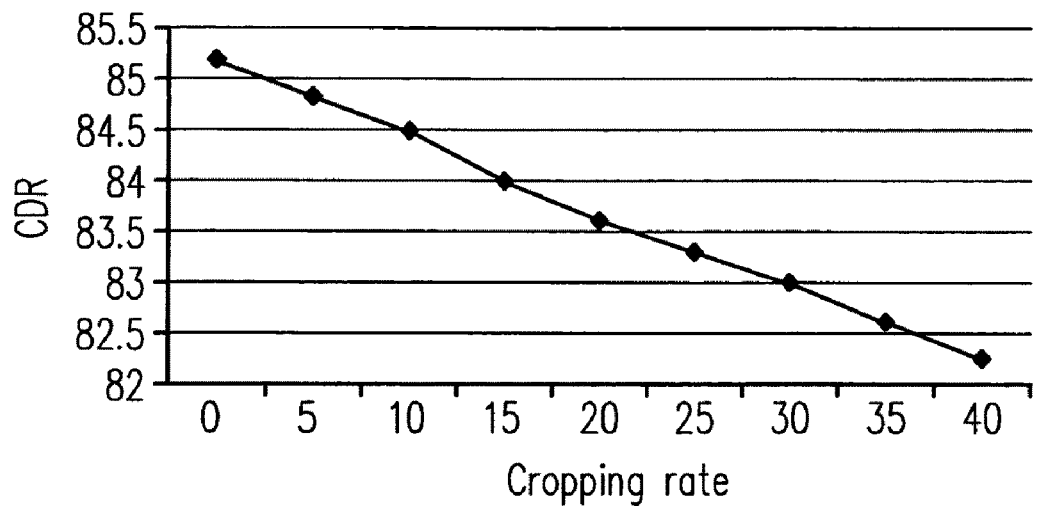
FIG. 24 is the first experimental chart showing the relationship between a cropping rate and the CDR of the halftone image when finishing a cropping attack.
Figure 25:
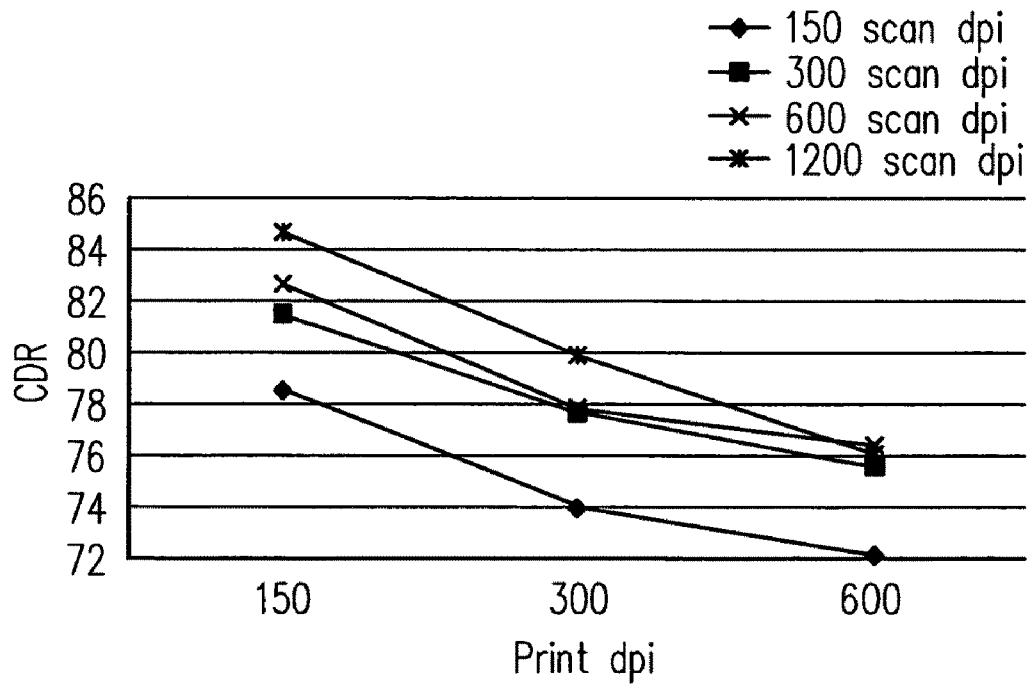
FIG. 25 is the second experimental chart showing the relationship between a print resolution and the CDR when finishing a printing attack.

In order to estimate the preservation ability, of the halftone images generated according to the present invention, for protecting the information of the hidden watermark from attacks, such as cropping attacks and printing attacks, two experimental charts are obtained based on practical operations. Please refer to FIGS. 24 and 25. FIG. 24 is the first experimental chart showing the relationship between a cropping rate and the CDR of the halftone image when finishing a cropping attack, and FIG. 25 is the second experimental chart showing the relationship between a print resolution and the CDR when finishing a printing attack. The horizontal axis in FIG. 24 indicates the cropping rate of the cropping attack, and the horizontal axis in FIG. 25 indicates the print resolution of the printing attack. It is obvious that preservation ability of the present invention for protecting the information of the hidden watermark from various attacks is excellent.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed:

1. A method for hiding a watermark using halftoning, the method comprising:
    receiving an original image by a device;
    performing, by an encoder of the device, a first error diffusion procedure to convert the original image to a first halftone image according to a threshold value and a weight matrix;
    setting a noise value by the encoder; and
    performing, by the encoder, a second error diffusion procedure to transform the original image and the watermark into a second halftone image according to the threshold value, the weight matrix, and the noise value, wherein an offset value of a pixel of the second halftone image at coordinate (i, j) is determined according to a pixel value of a pixel of the first halftone image at coordinate (i, j) and a pixel value of the watermark at coordinate (i, j), the second error diffusion procedure adjusts an original error value of the pixel of the second halftone image at coordinate (i, j) to generate an adjusted error value according to the offset value of the pixel of the second halftone image at coordinate (i, j), and the second error diffusion procedure diffuses the adjusted error value to other pixels neighboring the pixel of the second halftone image at coordinate (i, j) according to the weight matrix;
    wherein a pixel value of the pixel of the second halftone image at coordinate (i, j) is determined to be alternatively equal to one of two pixel values according to the threshold value, the original error value of the pixel of the second halftone image at coordinate (i, j) is equal to a result of subtracting the pixel value of the second halftone image at coordinate (i, j) from a gained value of the second halftone image at coordinate (i, j), the gained value of the second halftone image at coordinate (i, j) is equal to a sum of the offset value of the pixel of the second halftone image at coordinate (i, j) and an input value of the pixel of the second halftone image at coordinate (i, j), and the input value of the pixel of the second halftone image at coordinate (i, j) is determined according to a pixel value of a pixel of the original image at coordinate (i, j) and error values diffused from previously processed pixels of the second halftone image prior to the pixel of the second halftone image at coordinate (i, j).

2. The method as claimed in claim 1, wherein the watermark is a halftone image.

3. The method as claimed in claim 2, wherein the offset value of the pixel of the second halftone image at coordinate (i, j) is determined to be alternatively equal to the noise value or a negative of the noise value.

4. The method as claimed in claim 3, wherein if the pixel value of the watermark at coordinate (i, j) is equal to the pixel value of the pixel of the first halftone image at coordinate (i, j), the offset value of the pixel of the second halftone image at coordinate (i, j) is equal to the noise value.

5. The method as claimed in claim 3, wherein if the pixel value of the watermark at coordinate (i, j) is different from the pixel value of the pixel of the first halftone image at coordinate (i, j), the offset value of the pixel of the second halftone image at coordinate (i, j) is equal to the negative of the noise value.

6. The method as claimed in claim 1, wherein the watermark is a grayscale image.

7. The method as claimed in claim 6, wherein when the pixel value of the watermark at coordinate (i, j) is different from a maximum pixel value and a minimum pixel value for displaying the watermark, the offset value of the pixel of the second halftone image at coordinate (i, j) is alternatively equal to $$\left(N_A \times \frac{W_{i,j}}{N_{\text{diff}}}\right)$$

or $$\left(N_A \times \left(1 - \frac{W_{i,j}}{N_{\text{diff}}}\right)\right),$$

where $N_A$ is the noise value, $W_{i,j}$ is the pixel value of the watermark at coordinate (i, j), and $N_{\text{diff}}$ is a difference between the maximum pixel value and the minimum pixel value for displaying the watermark.

8. The method as claimed in claim 7, wherein if the pixel value of the pixel of the first halftone image at coordinate (i, j) is equal to a maximum of two pixel values for displaying the first halftone image, the offset value of the pixel of the second halftone image at coordinate (i, j) is equal to $$\left(N_A \times \frac{W_{i,j}}{N_{\text{diff}}}\right).$$

9. The method as claimed in claim 7, wherein if the pixel value of the pixel of the first halftone image at coordinate (i, j) is equal to a minimum of two pixel values for displaying the first halftone image, the offset value of the pixel of the second halftone image at coordinate (i, j) is equal to $$\left(N_A \times \left(1 - \frac{W_{i,j}}{N_{\text{diff}}}\right)\right).$$

10. The method as claimed in claim 1 further comprising:
    superimposing the first halftone image with the second halftone image to generate a superimposed halftone image having an embedded image resembling the watermark.

11. The method of claimed in claim 1 further comprising:
superimposing the first halftone image with the second halftone image to generate a superimposed halftone image;
performing a filtering procedure to convert the superimposed halftone image to a first filtered image and convert the first halftone image to a second filtered image; and
generating a restoration image based on the first filtered image and the second filtered image, wherein a pixel value of a pixel of the restoration image at coordinate (i, j) is equal to a sum of a restoration value $H'_{i,j}$ of the restoration image at coordinate (i, j) and an absolute value of a minimum value $H'_{min}$, the restoration value $H'_{i,j}$ is equal to a result of subtracting a pixel value of the second filtered image at coordinate (i, j) from a pixel value of the first filtered image at coordinate (i, j), and the minimum value $H'_{min}$ is the minimum of all restoration values of the restoration image.

12. The method of claimed in claim 1 further comprising:
printing the first halftone image on a first transparent medium;
printing the second halftone image on a second transparent medium; and
overlapping the first transparent medium having the first halftone image printed thereon with the second transparent medium having the second halftone image printed thereon.

13. A method for hiding a watermark using halftoning, the method comprising:
receiving an original image by a device;
setting a noise value by an encoder of the device; and
performing, by the encoder, an error diffusion procedure to transform an original image and the watermark into a halftone image according to a threshold value, a weight matrix, a horizontal value dx, a vertical value dy, and the noise value, wherein an offset value of a pixel of the halftone image at coordinate (i, j) is determined according to a pixel value of a pixel of the halftone image at coordinate (i−dx, j−dy) and a pixel value of the watermark at coordinate (i−dx, j−dy), a parameter i of the coordinate (i, j) is greater than the horizontal value dx, a parameter j of the coordinate (i, j) is greater than the vertical value dy, the error diffusion procedure adjusts an original error value of the pixel of the halftone image at coordinate (i, j) to generate an adjusted error value according to the offset value of the pixel of the halftone image at coordinate (i, j), the error diffusion procedure diffuses the adjusted error value to other pixels neighboring the pixel of the halftone image at coordinate (i, j) according to the weight matrix, and a pixel value of the pixel of the halftone image at coordinate (i, j) is determined to be alternatively equal to one of two pixel values according to the threshold value;
wherein the original error value of the pixel of the halftone image at coordinate (i, j) is equal to a result of subtracting the pixel value of the halftone image at coordinate (i, j) from a gained value of the halftone image at coordinate (i, j), the gained value of the halftone image at coordinate (i, j) is equal to a sum of the offset value of the pixel of the halftone image at coordinate (i, j) and an input value of the pixel of the halftone image at coordinate (i, j), and the input value of the pixel of the halftone image at coordinate (i, j) is determined according to a pixel value of a pixel of the original image at coordinate (i, j) and error values diffused from previously processed pixels of the halftone image prior to the pixel of the halftone image at coordinate (i, j).

14. The method as claimed in claim 13, wherein when the pixel value of the watermark at coordinate (i, j) is different from a maximum pixel value and a minimum pixel value for displaying the watermark, the offset value of the pixel of the halftone image at coordinate (i, j) is alternatively equal to $$\left(N_A \times \frac{W_{i-dx,j-dy}}{N_{diff}}\right)$$

or $$\left(N_A \times \left(1 - \frac{W_{i-dx,j-dy}}{N_{diff}}\right)\right),$$

where $N_A$ is the noise value, $W_{i-dx,j-dy}$ is the pixel value of the watermark at coordinate (i−dx, j−dy), and $N_{diff}$ is a difference between the maximum pixel value and the minimum pixel value for displaying the watermark.

15. The method as claimed in claim 14, wherein if the pixel value of the pixel of the halftone image at coordinate (i−dx, j−dy) is equal to a maximum of two pixel values for displaying the halftone image, the offset value of the pixel of the halftone image at coordinate (i, j) is equal to $$\left(N_A \times \frac{W_{i-dx,j-dy}}{N_{diff}}\right).$$

16. The method as claimed in claim 14, wherein if the pixel value of the pixel of the halftone image at coordinate (i−dx, j−dy) is equal to a minimum of two pixel values for displaying the halftone image, the offset value of the pixel of the halftone image at coordinate (i, j) is equal to $$\left(N_A \times \left(1 - \frac{W_{i-dx,j-dy}}{N_{diff}}\right)\right).$$

17. The method of claimed in claim 13 further comprising:
generating a process image by selecting a plurality of pixels of the halftone image at Coordinates $$\sum_{x=dx+1}^{P} \sum_{y=dy+1}^{Q} (x, y),$$

wherein P is a number of rows of the pixels of halftone image, and Q is a numbers of columns of the pixels of the halftone image;
superimposing the process image with the halftone image to generate a superimposed halftone image;
performing a filtering procedure to convert the superimposed halftone image to a first filtered image and convert the halftone image to a second filtered image; and
generating a restoration image based on the first filtered image and the second filtered image, wherein a pixel value of a pixel of the restoration image at coordinate (s, t) is equal to a sum of a restoration value $H'_{s,t}$ of the restoration image at coordinate (s, t) and an absolute value of a minimum value, the restoration value $H'_{s,t}$ is equal to a result of subtracting a pixel value of the second filtered image at coordinate (s, t) from a pixel value of the first filtered image at coordinate (s, t), and the minimum value is the minimum of all restoration values of the restoration image.

18. The method of claimed in claim 13 further comprising:

printing the halftone image on a first transparent medium;

printing the halftone image on a second transparent medium; and overlapping the first transparent medium having the halftone image printed thereon with the second transparent medium having the halftone image printed thereon, wherein the coordinate (i, j) of the halftone image printed on the first transparent medium is aligned with the coordinate (i−dx, j−dy) of the halftone image printed on the second transparent medium.

* * * * *